United States Patent
Ke

(10) Patent No.: US 9,851,811 B2
(45) Date of Patent: Dec. 26, 2017

(54) ELECTRONIC DEVICE AND METHOD FOR CONTROLLING THE SAME

(71) Applicants: Beijing Lenovo Software Ltd, Beijing (CN); Lenovo (Beijing) Co., Ltd., Beijing (CN)

(72) Inventor: Haibin Ke, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 280 days.

(21) Appl. No.: 13/769,624

(22) Filed: Feb. 18, 2013

(65) Prior Publication Data

US 2013/0215011 A1 Aug. 22, 2013

(30) Foreign Application Priority Data

Feb. 20, 2012 (CN) .......................... 2012 1 0040084
Mar. 5, 2012 (CN) .......................... 2012 1 0055789
(Continued)

(51) Int. Cl.
*G06F 3/03* (2006.01)
*G06F 3/0487* (2013.01)
*G06F 1/16* (2006.01)

(52) U.S. Cl.
CPC .............. *G06F 3/03* (2013.01); *G06F 1/1643* (2013.01); *G06F 1/1652* (2013.01);
(Continued)

(58) Field of Classification Search
CPC .......... G06F 3/044; G06F 3/045; G06F 3/041; G06F 3/0412; G06F 1/1652; G06F 1/1626; G06F 2203/04102; G06F 3/0414
See application file for complete search history.

(56) References Cited

U.S. PATENT DOCUMENTS 7,082,578 B1 * 7/2006 Fishkin et al. ................ 715/863
7,777,727 B2 8/2010 Cha et al.
(Continued)

FOREIGN PATENT DOCUMENTS

CN 1794339 A 6/2006
CN 101359275 A 2/2009
(Continued)

OTHER PUBLICATIONS

First Chinese Office Action regarding Application No. 201210040084.2, dated Feb. 25, 2015.
(Continued)

*Primary Examiner* — Priyank Shah
(74) *Attorney, Agent, or Firm* — Harness, Dickey & Pierce, P.L.C.

(57) ABSTRACT

An electronic device and a method for controlling the same are disclosed. The electronic device has a flexible display screen, and the flexible display screen has a first display region. The method for controlling the electronic device includes: detecting whether the flexible display screen is bent to generate detection information; and dividing a first display region into a first display sub-region and a second display sub-region in the case that the detection information indicates that the flexible display screen is bent, where the first display sub-region is independent of the second display sub-region.

26 Claims, 19 Drawing Sheets

(30) Foreign Application Priority Data

| | | |
|---|---|---|
| Mar. 5, 2012 | (CN) | 2012 1 0056038 |
| Mar. 5, 2012 | (CN) | 2012 1 0056076 |
| Mar. 13, 2012 | (CN) | 2012 1 0065447 |

(52) U.S. Cl.
CPC .......... *G06F 1/1694* (2013.01); *G06F 3/0487* (2013.01); *G06F 2200/1637* (2013.01)

(56) References Cited

U.S. PATENT DOCUMENTS

| | | | | |
|---|---|---|---|---|
| 7,996,045 | B1* | 8/2011 | Bauer | G06F 3/0488 455/466 |
| 8,319,725 | B2* | 11/2012 | Okamoto | G02F 1/133305 345/107 |
| 8,502,788 | B2 | 8/2013 | Cho | |
| 8,928,580 | B2* | 1/2015 | Hwang | G06F 1/1626 345/156 |
| 2003/0160735 | A1* | 8/2003 | Lee | G06F 3/147 345/4 |
| 2004/0008191 | A1* | 1/2004 | Poupyrev et al. | 345/184 |
| 2004/0212588 | A1 | 10/2004 | Moriyama | |
| 2006/0146035 | A1 | 7/2006 | Cha et al. | |
| 2008/0303782 | A1* | 12/2008 | Grant et al. | 345/156 |
| 2010/0117975 | A1 | 5/2010 | Cho | |
| 2010/0321275 | A1* | 12/2010 | Hinckley | G06F 1/1618 345/1.3 |
| 2011/0012845 | A1* | 1/2011 | Rothkopf et al. | 345/173 |
| 2011/0032205 | A1* | 2/2011 | David | B32B 17/064 345/173 |
| 2011/0050657 | A1* | 3/2011 | Yamada | H01L 27/3293 345/204 |
| 2012/0057064 | A1* | 3/2012 | Gardiner et al. | 348/333.12 |
| 2012/0081322 | A1* | 4/2012 | Sirpal | G06F 1/1616 345/173 |
| 2012/0092363 | A1* | 4/2012 | Kim | G06T 5/006 345/618 |
| 2012/0133621 | A1* | 5/2012 | Kim | 345/204 |
| 2012/0212433 | A1* | 8/2012 | Lee | G06F 1/1652 345/173 |
| 2012/0235893 | A1* | 9/2012 | Phillips | G06F 3/012 345/156 |
| 2012/0313862 | A1* | 12/2012 | Ko | G09G 3/3433 345/173 |
| 2013/0009999 | A1 | 1/2013 | Peng | |
| 2013/0044052 | A1* | 2/2013 | Hong | G06F 3/0414 345/156 |
| 2013/0085705 | A1* | 4/2013 | Jano | H04M 1/0208 702/127 |
| 2013/0127918 | A1* | 5/2013 | Kang | G06F 3/017 345/660 |
| 2013/0201115 | A1* | 8/2013 | Heubel | G06F 3/0487 345/173 |
| 2013/0215041 | A1* | 8/2013 | Kim et al. | 345/173 |
| 2014/0098034 | A1* | 4/2014 | Hack | G06F 1/1677 345/173 |
| 2014/0254111 | A1* | 9/2014 | Yamazaki | H01L 51/0097 361/749 |

FOREIGN PATENT DOCUMENTS

| | | |
|---|---|---|
| CN | 101374177 A | 2/2009 |
| CN | 101437052 A | 5/2009 |
| CN | 101739171 A | 6/2010 |
| CN | 101887663 A | 11/2010 |
| CN | 201716963 U | 1/2011 |
| CN | 102193719 A | 9/2011 |
| CN | 102314856 A | 1/2012 |
| EP | 2202624 A2 | 6/2010 |
| JP | 2006243621 A | 9/2006 |
| JP | 2008026875 A | 2/2008 |
| JP | 2009187281 A | 8/2009 |
| WO | WO-2011091762 A1 | 8/2011 |

OTHER PUBLICATIONS

First Chinese Office Action regarding Application No. 201210056076.7, dated Jul. 3, 2014.
Second Chinese Office Action regarding Application No. 201210056076.7, dated Jan. 27, 2015.
First Chinese Office Action regarding Application No. 201210065447.8 dated Jul. 14, 2015. English translation provided by Unitalen Attorneys at Law.
First Chinese Office Action regarding Application No. 201210055789.1 dated Sep. 1, 2015. English translation provided by Unitalen Attorneys at Law.
First Chinese Office Action regarding Application No. 201210056038.1 dated Mar. 20, 2015. English translation provided by Unitalen Attorneys at Law.
Second Chinese Office Action regarding Application No. 201210065447.8 dated Mar. 21, 2016. English translation provided by Unitalen Attorneys at Law.
Third Chinese Office Action regarding Application No. 201210065447.8 dated Sep. 28, 2016. English translation provided by Unitalen Attorneys at Law.

* cited by examiner

ELECTRONIC DEVICE AND METHOD FOR CONTROLLING THE SAME

This application claims the priorities of Chinese Patent Application No. 201210040084.2, entitled "ELECTRONIC DEVICE AND METHOD FOR CONTROLLING THE SAME", filed with the Chinese Patent Office on Feb. 20, 2012; Chinese Patent Application No. 201210056038.1, entitled "METHOD AND ELECTRONIC DEVICE FOR ADJUSTING RESOLUTION", filed with the Chinese Patent Office on Mar. 5, 2012; Chinese Patent Application No. 201210055789.1, entitled "DISPLAY METHOD AND ELECTRONIC DEVICE", filed with the Chinese Patent Office on Mar. 5, 2012; Chinese Patent Application No. 201210065447.8, entitled "METHOD AND ELECTRONIC DEVICE OF INPUT AND DISPLAY", filed with the Chinese Patent Office on Mar. 13, 2012; and Chinese Patent Application No. 201210056076.7, entitled "ELECTRONIC DEVICE AND METHOD FOR CONTROLLING THE SAME", filed with the Chinese Patent Office on Mar. 5, 2012, which are incorporated by reference in their entireties herein.

FIELD OF THE INVENTION

The invention relates to the technical field of computer, and in particular to an electronic device and a method for controlling the same.

BACKGROUND OF THE INVENTION

In order to meet the increasing requirement of the user, various kinds of electronic devices, for example, an electronic device with a flexible display screen, such as a flexible mobile phone, are developed. Since the electronic device can be folded, bent or curled, the electronic device will not be damaged even if it is bent by mistake, and thus the electronic device is favored by the customers. Further, with the increasing development and improvement of the electronic device, more precise electronic devices are developed, thus the requirements on the display device becomes higher and higher, the high-precision display gets more and more popular, and thus the requirement on the definition is becoming higher and higher.

However, during the implementation of the invention, the inventor finds that in the prior art, the electronic device can only be bent, folded or curled, the electronic device can be prevented from being damaged by mistake, and the display object on the flexible display screen will still be displayed on the whole display screen after the electronic device is folded. However, due to the folding, the display object at the folded location is also folded, affecting the customer to watch. Meanwhile, the electronic device has single-function, which is a waste of resource.

Moreover, in the prior art, because the common display screen on the electronic device can not be divided into some screen regions, and the display range and the display content of the display screen on the electronic device are limited, the customer can not work and entertain at the same time, and the interaction among multiple customers can not be displayed, and thus the display effect is reduced and the service efficiency of the electronic device is decreased.

SUMMARY OF THE INVENTION

To solve the above technical problems, a object of the invention is to provide a method for controlling an electronic device, the electronic device having a flexible display screen with a first display region, and the method includes:

detecting whether the flexible display screen is bent to generate detection information; and dividing the first display region into a first display sub-region and a second display sub-region, in the case that the detection information indicates that the flexible display screen is bent, where the first display sub-region is independent of the second display sub-region.

It is provided an electronic device according to an aspect of the invention, and the electronic device includes:

a flexible display screen with a first display region;

a detection unit for detecting whether the flexible display screen is bent to generate detection information; and a division unit for dividing the first display region into a first display sub-region and a second display sub-region, in the case that the detection information indicates that the flexible display screen is bent, where the first display sub-region is independent of the second display sub-region.

DETAILED DESCRIPTION OF THE INVENTION

The embodiments of the invention will be explained in reference to the drawings in the following. The elements and features described in one drawing or embodiment of the invention can be combined with the one or more elements and features described in other drawings or embodiments. It is to be noted that for the purpose of clarity, the illustration and description of the components and processes which have no relation to the invention or are well-known to those skilled in the art are omitted from the drawings and descriptions.

Figure 1:
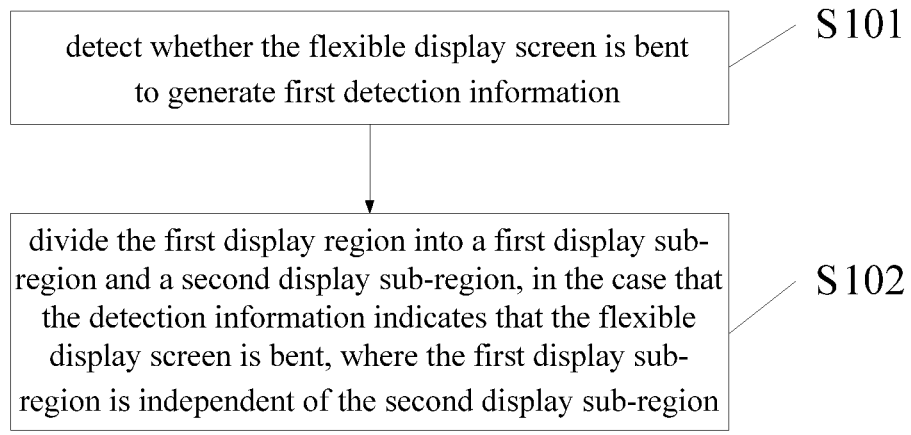
FIG. 1 is a flowchart of a method for controlling an electronic device according to an embodiment of the invention.

A method for controlling an electronic device is provided according to an embodiment of the invention, in which the electronic device has a flexible display screen with a first display region. Reference is made to FIG. 1, which is a flowchart of the method for controlling the electronic device according to this embodiment.

As shown in FIG. 1, the method includes:

Step S101, detecting whether the flexible display screen is bent to generate detection information; and Step S102, dividing the first display region into a first display sub-region and a second display sub-region, in the case that the detection information indicates that the flexible display screen is bent, in which the first display sub-region is independent of the second display sub-region.

To explain the invention in more detail, a specific example is given in the following where the electronic device takes a bar phone as an example.

Figure 2A:
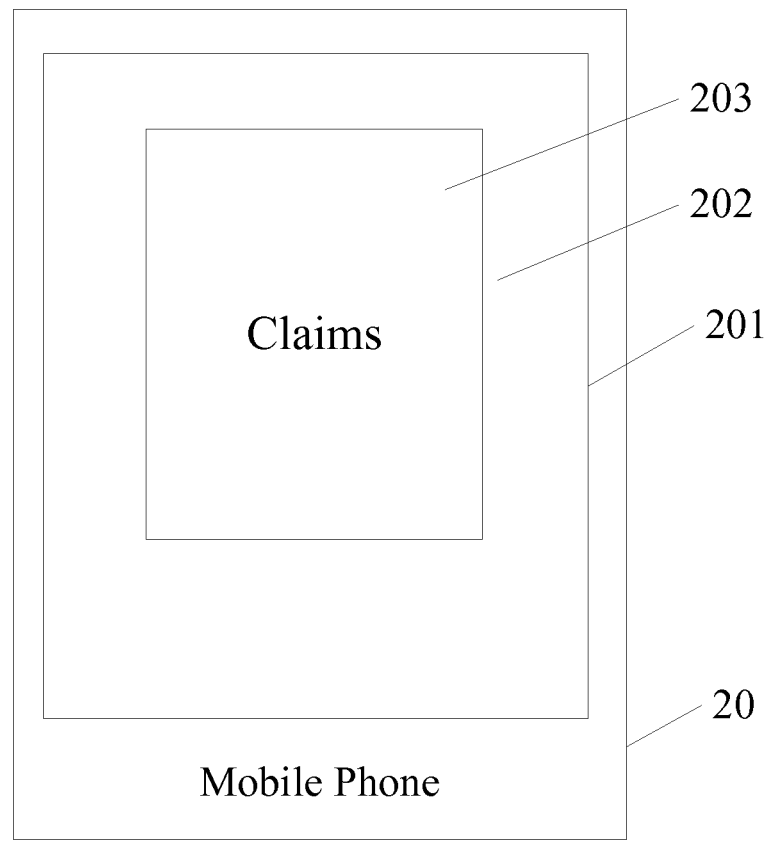
FIG. 2A to FIG. 2H are schematic diagrams of an electronic device according to an embodiment of the invention.

Referring to FIG. 2A, for example, the mobile phone 20 includes a flexible display screen 201 with a first display region 202, on which a display object 203, such as a word document, is displayed. A word "claims" is wrote on the word document. For example, in the state of FIG. 2, the step S101 is performed to detect whether the flexible display screen 201 is bent. For example, by providing weight sensors or spatial sensors on both the top and the bottom of the flexible display screen 201, whether the flexible display screen 201 is bent can be determined based on the variance in the weight of the flexible display screen 201. In another embodiment, tilt sensors can be further provided at both the left side and right side of the flexible display screen 201. Once the flexible display screen 201 is bent, the bending will be sensed by the tilt sensor, so as to generate detection information.

Further, in the step S102, the first display region 202 is divided into a first display sub-region 206 and a second display sub-region 207, in the case that the detection information indicates that the flexible display screen 201 is bent, where the first display sub-region 206 is independent of the second display sub-region 207.

Figure 2B:
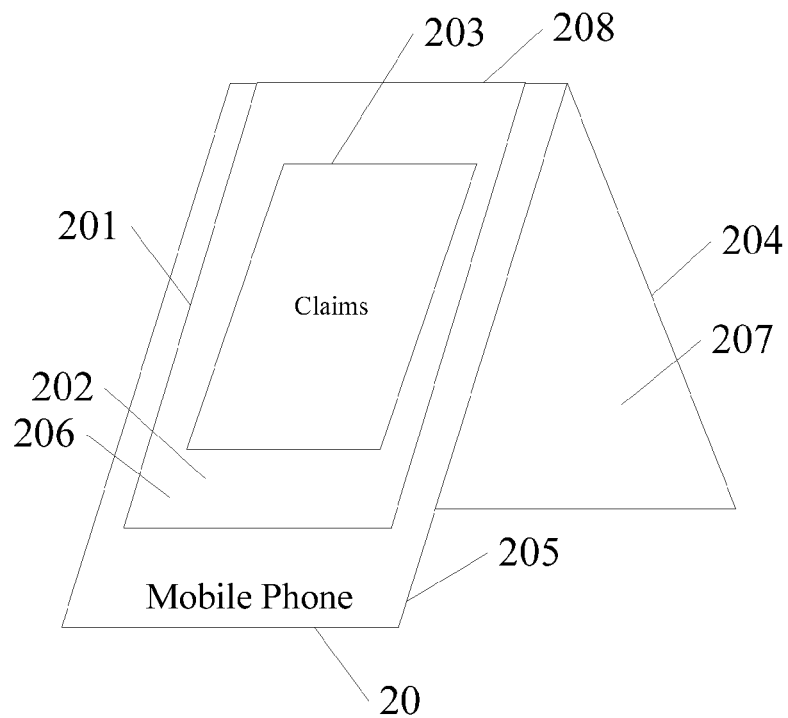

In another embodiment, before the step S102, it is determined whether the bending angle of the flexible display screen 201 meets a predetermined condition. The step S102 is to be performed only when the bending angle meets the predetermined condition, so as to avoid any error in operation. In this embodiment, the predetermined condition is a bending angle of the flexible display screen 201 when a first part of the flexible display screen 201 can be sheltered by a second part of the flexible display screen 201. For example, the bending angle for the predetermined condition is between 160° and 180°. Therefore, it is determined that the predetermined condition is met, as long as the bending angle of the flexible display screen 201 is less than 160°. Referring to FIG. 2B, the angle between the first part 204 and the second part 205 is 60°, that is, the bending angle of the flexible display screen 201 meets the predetermined condition, and then the first part 204 has been sheltered by the second part 205.

When the bending angle of the flexible display screen 201 meets the predetermined condition, decision information is generated, and then the step S102 is performed.

Referring to FIG. 2B, specifically, in the step S102, a dividing line 208 is determined in the first display region 202, and then the first display region 202 is divided into a first display sub-region 206 and a second display sub-region 207 with respect to the dividing line 208. The position of the dividing line 208 can be detected by providing a sensor on the flexible display screen. The specific rule for dividing is to, for example, determine the display sub-region based on the dividing line 208 and the boundary of the flexible display screen 201.

Referring to FIG. 2A and FIG. 2B, when the first display region 202 is divided into the first display sub-region 206 and the second display sub-region 207, the display object 203 is zoomed out, i.e., is displayed at the first display sub-region 206 in the size suitable for the first display sub-region 206. Therefore, even if the flexible display screen 201 is bent, the customer can still see in the first display sub-region 206 the complete content of the display object 203 before the bending. Thus, the use of the customer is not affected even if the flexible display screen 201 is bent.

Figure 2C:
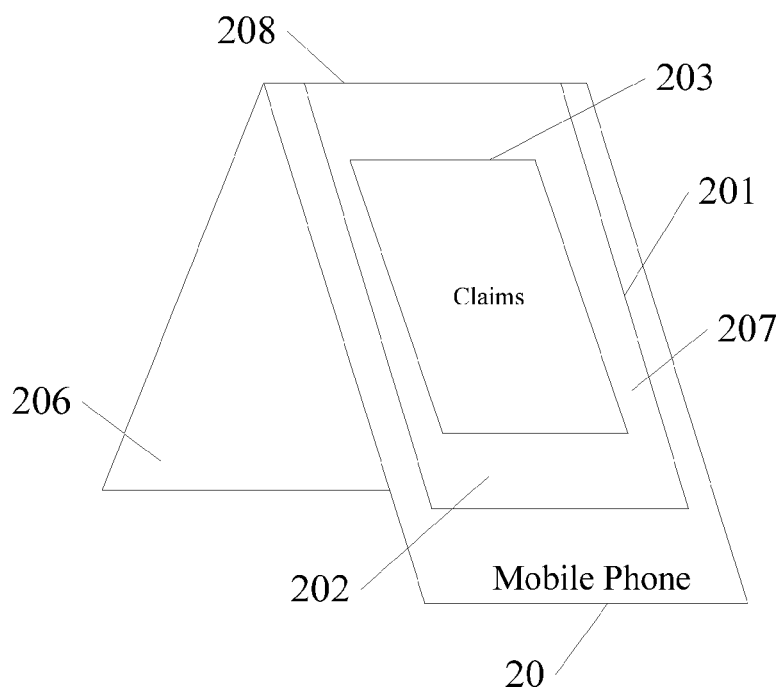

Further, when the first display region 202 is divided into the first display sub-region 206 and the second display sub-region 207, the display object 203 can also be zoomed out, i.e., is displayed at the second display sub-region 207 in the size suitable for the second display sub-region 207, referring to FIG. 2C. Therefore, when the flexible display screen 201 is bent and the first display region 202 is divided into two sub-regions, the display object 203 that is previously displayed in the first display region 202 will be displayed in the two display sub-regions respectively, so that the customer can also see in the second display sub-region 207 the complete content of the display object 203 before the bending.

Figure 5A:
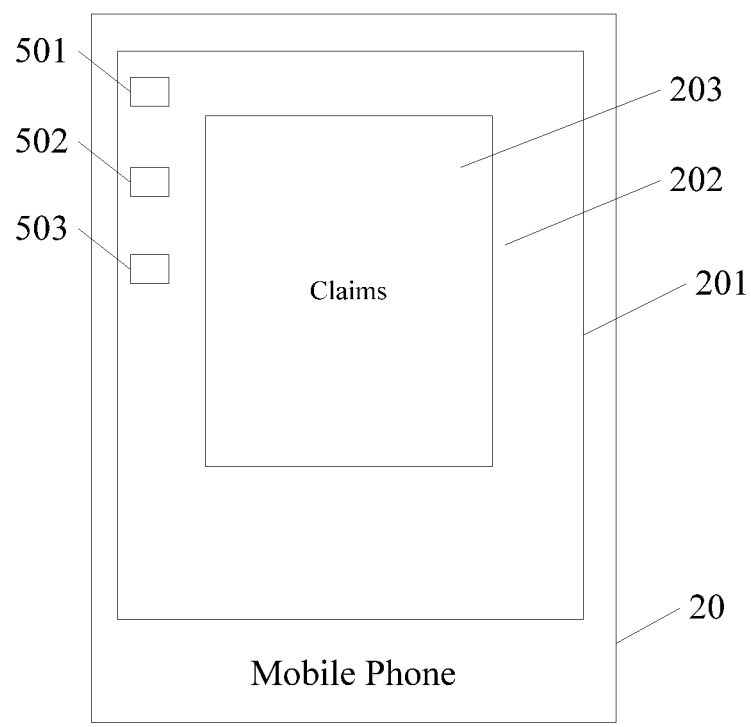
FIG. 5A to FIG. 5C are schematic diagrams of a bent electronic device according to an embodiment of the invention.
Figure 5B:
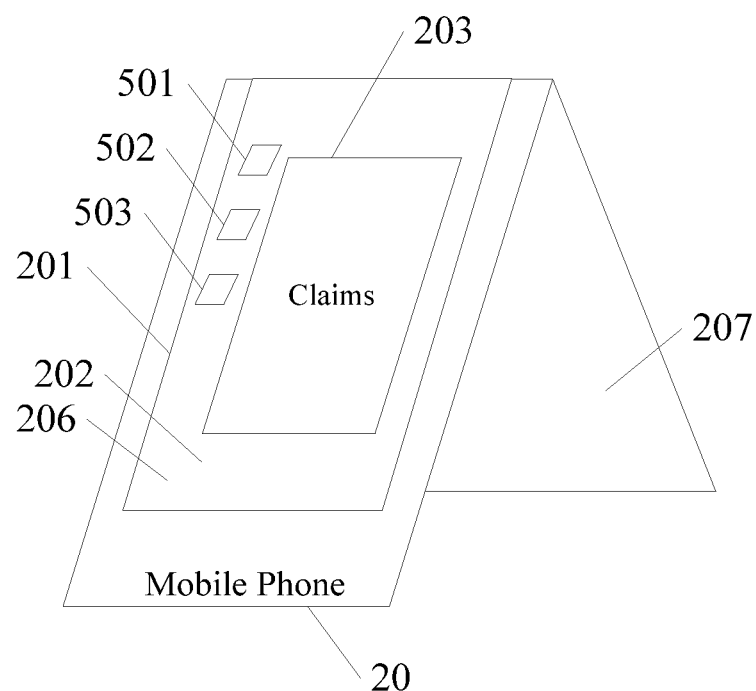
Figure 5C:
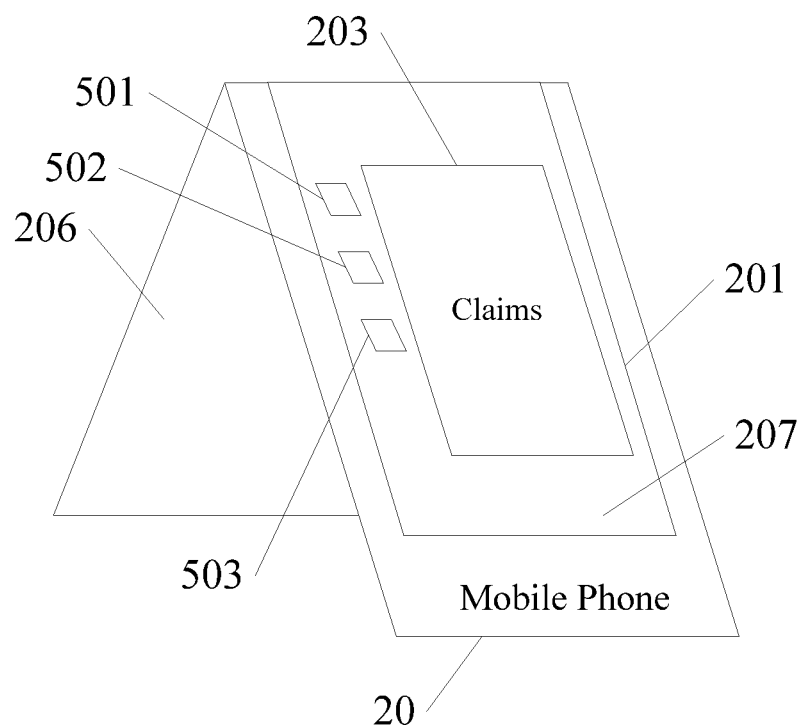

In another embodiment, as shown in FIG. 5A, the difference form FIG. 2A is that a first icon 501, a second icon 502 and a third icon 503 are further displayed on the first display region 202. In this embodiment, when the first display region 202 is divided into the first display sub-region 206 and the second display sub-region 207, any one or all of the first icon 501, the second icon 502, the third icon 503 and the display object 203 are displayed on the first display sub-region 206 and the second display sub-region 207. As shown in FIG. 5B, each of the first icon 501, the second icon 502, the third icon 503 and the display object 203 can be displayed in the first display sub-region 206. As shown in FIG. 2C, only the display object 203 can be displayed in the second display sub-region 207; and further as shown in FIG. 5C, each of the first icon 501, the second icon 502, the third icon 503 and the display object 203 can be displayed in the second display sub-region 207. The first icon 501, the second icon 502 and the third icon 503 are for example the icons on the system operation interface of the electronic device, the display object 203 is for example the application started by the customer, and the contents displayed respectively in the first display sub-region 206 and the second display sub-region 207 can be configured by the customer.

Figure 6:
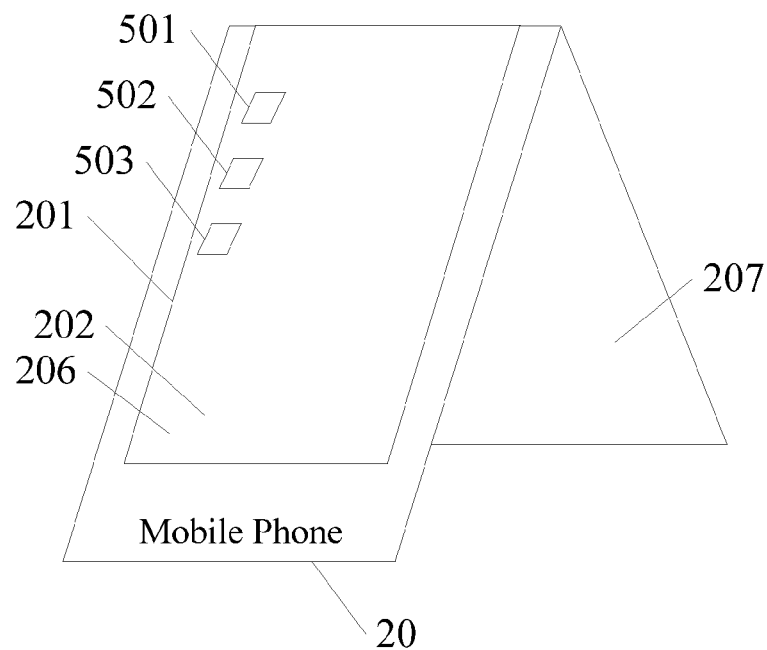
FIG. 6 is a schematic diagram of a bent electronic device according to another embodiment of the invention.

In yet another embodiment, the customer can perform operations on the first display sub-region 206 and the second display sub-region 207 independently, i.e., display the operation result in the first display sub-region 206 and do not display this operation result in the second display sub-region 207. FIG. 6 is a state diagram after a closing operation is performed on the display object 203 in FIG. 5B. It can be seen from FIG. 6 that when the display object 203 is closed, only the first icon 501, the second icon 502 and the third icon 503, rather than the display object 203, are displayed in the first display sub-region 206. However, in the second display sub-region 207, the display state does not change, and the display object 203 is still displayed in the second display sub-region 207, still as shown in FIG. 5C.

Figure 2D:
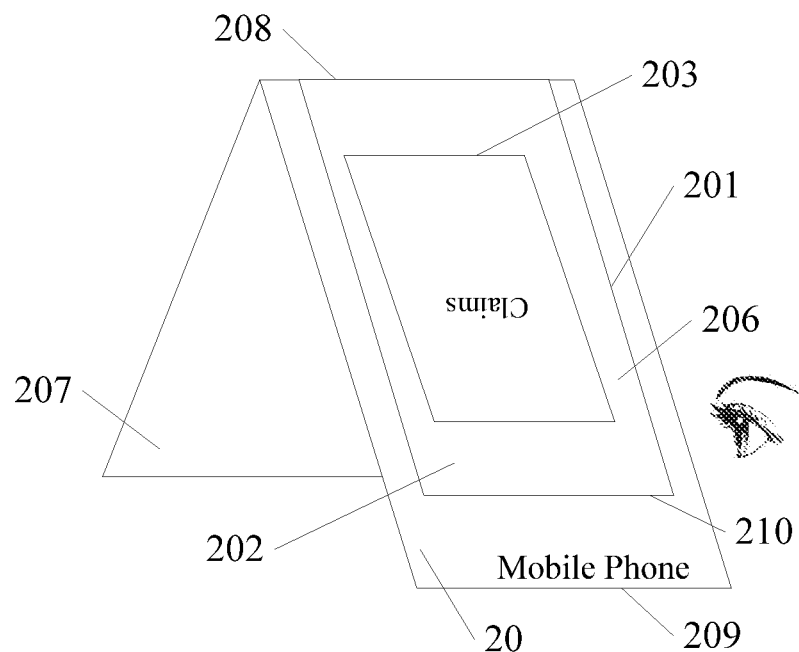

It can be seen from the above description that after the folding, the first display region 202 is divided into the first display sub-region 206 and the second display sub-region 207 with respect to the folding line 208, and the display object 203 can be displayed in both the first display sub-region 206 and the second display sub-region 207. Although the display objects 203 in FIG. 2B and FIG. 2D are both zoomed out, the display directions of the display objects 203 in the first display sub-region 206 in FIG. 2B and in the second display sub-region 207 in the FIG. 2D are consistent with the display direction of the display object 203 in the first display region 202 in FIG. 2A, thus when the customer watch the display object 203 on the second display sub-region 207, the display direction of the display object 203 in the second display sub-region 207 just conform to the watch custom of the customer, and the customer will not feel uncomfortable. However, as shown in FIG. 2D, when the customer watches the display object 203 in the first display sub-region 206, the display object 203 seems to be reversed by 180°, it is inconvenient for reading and thus it is necessary to re-determine the display object 203 in the first display sub-region 206 in this case.

Figure 2E:
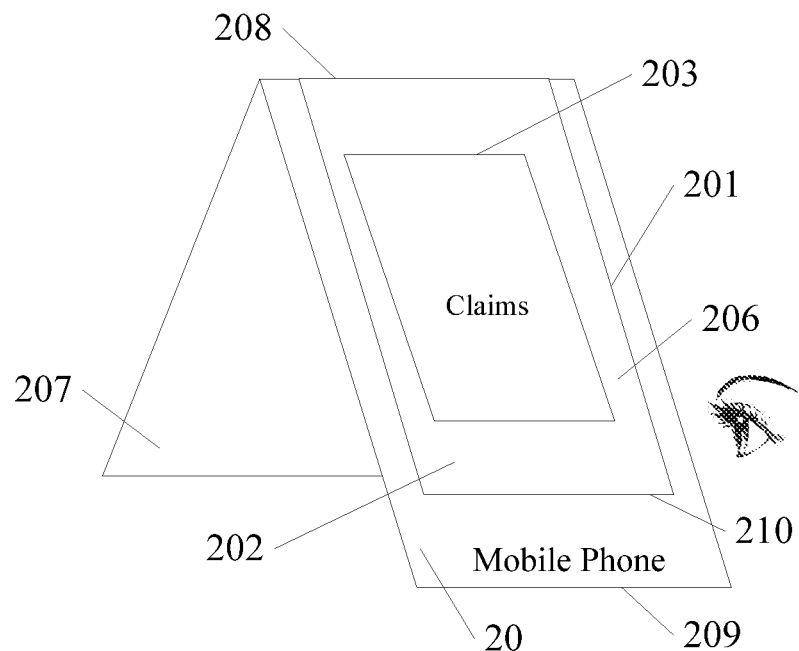

Specifically, for example, by taking the first display sub-region 206 as an example, the state of the first display sub-region 206 is detected. In this embodiment, the position information of the customer with respect to the first display sub-region 206 is detected. For example, the customer is shot by a camera, so as to detect to which side of the boundary of the first display sub-region 206 is closer to the customer. As shown in FIG. 2D, it is detected that the customer is closer to the boundary 209 of the mobile phone 20, and then it can be decided that the customer is closer to the boundary 210 of the first display sub-region 206, i.e., it is decided that the customer stands by the side of boundary 209 and watches the first display sub-region 206. Then, the step 102 is performed, and the display direction of the display object 203 in the first display sub-region 206 can be determined as: directing the bottom of the display object 203 to the boundary 209, and directing the top of the display object 203 to the folding line 208, as shown in FIG. 2E.

Thus, the customer can watch the display object 203 in the first display sub-region 206 normally.

In another embodiment, instead of the shoot of the customer with the camera, the position information of the customer with respect to the first display sub-region 206 can be detected by detecting the position of the mobile phone 20 held by the customer. For example, when the holding position of the customer is located at the left and right sides of the first display sub-region 206, the holding position can be detected at the left and right sides, meanwhile it can be detected that the direction of the thumb is opposite to the boundary 209. Thus, it can be determined that the customer stands at the position nearby the boundary 209, and the display direction of the display object 203 in the first display sub-region 206 is determined as: directing the bottom of the display object 203 to the boundary 209, and directing the top of the display object 203 to the folding line 208.

In practice, in the case that only one customer uses the mobile phone 20, after the flexible display screen 201 is folded, if the customer watches the second display sub-region 207 at first, the state of the second display sub-region 207, that is, the position relation between the customer and the second display sub-region 207, can be determined using the above method. In this way, the display direction of the display object 203 in the second display sub-region 207 is not adjusted but remains as shown in FIG. 2B, and the display direction of the display object 203 in the first display sub-region 206 also remains as shown in FIG. 2D. Because only one customer watches, only the display direction of the display object in the display sub-region watched by the customer needs to be adjusted.

Figure 2F:
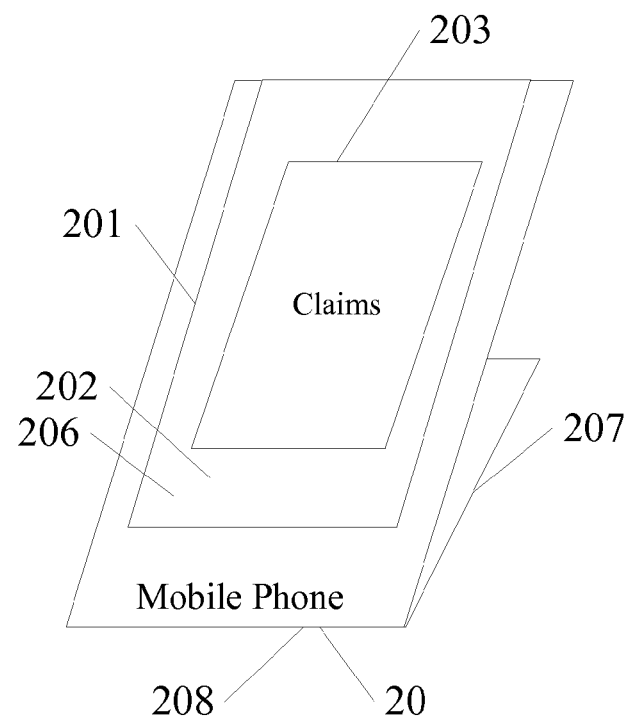
Figure 2G:
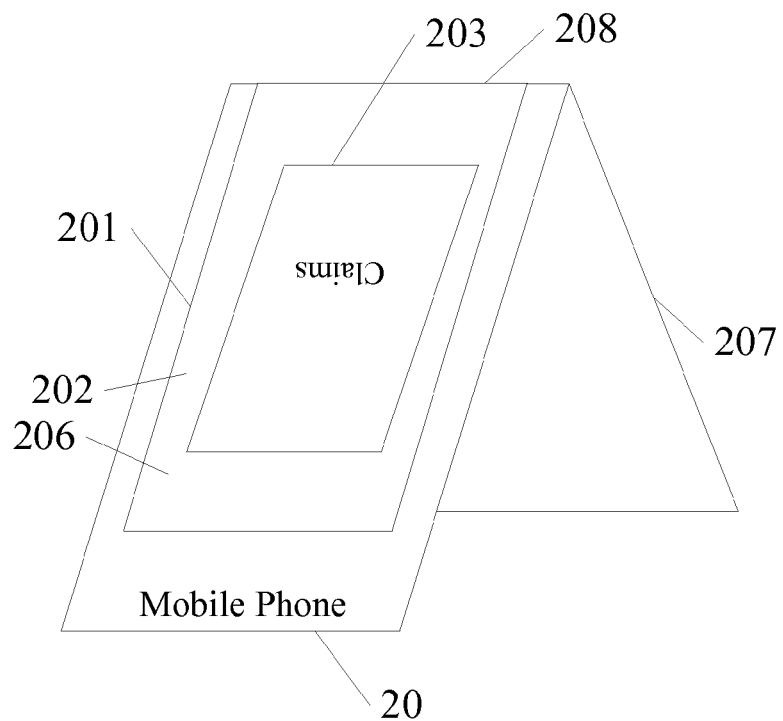
Figure 2H:
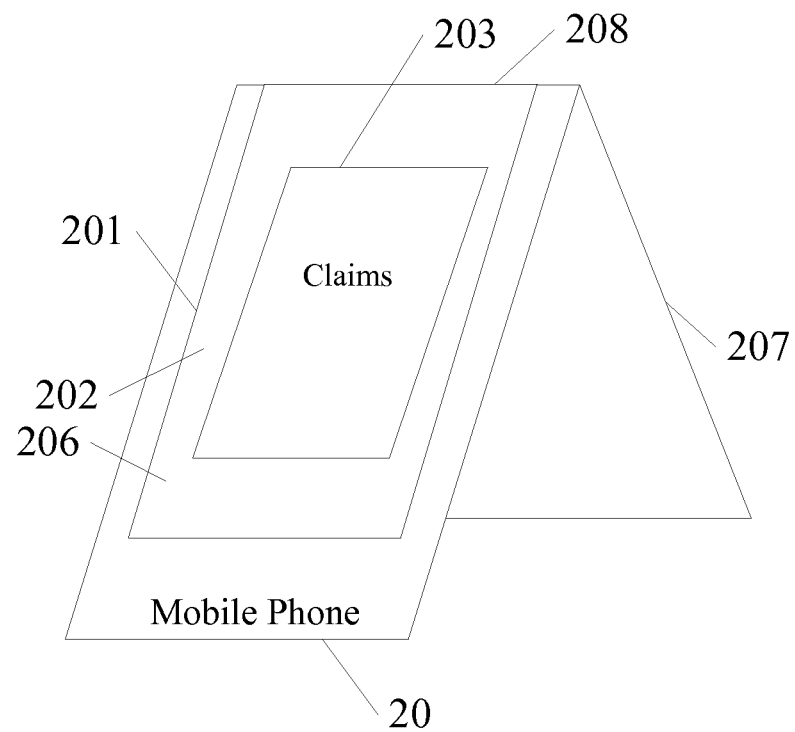

Further, when the mobile phone 20 is rotated by the customer from the state of FIG. 2B into that of FIG. 2F, i.e., reversed up and down, the position of the customer dose not change, i.e., the visual angle does not change. In this case, the original display direction of the display object 203 in the first display sub-region 206 just conforms to the visual angle of the customer, and thus the display direction needs not to be adjusted. However, when the mobile phone 20 is rotated by the customer from the state of FIG. 2B into that of FIG. 2G, i.e., reversed left and right, the position of the customer dose not change, i.e., the visual angle of the customer does not change, but the original display direction of the display object 203 in the first display sub-region 206 in FIG. 2G makes the customer feel that the display object 203 is reversed by 180°. In this case, the state in the first display sub-region 206 is determined using the above method, and the display direction of the display object 203 in the first display sub-region 206 is determined as: directing the top of the display object 203 to the folding line 208, as shown in FIG. 2H.

When two or more customers use the mobile phone 20 at the same time, for example, as shown in FIG. 2D, one of the customers is further watching the first display sub-region 206, the display direction of the display object 203 in the first display sub-region 206 needs to be adjusted using the above method as the state shown in FIG. 2E.

In the above embodiments, the display direction of the display object in the display region is adjusted according to the position information of the customer with respect to the display region. In the following, another example is given, in which the display direction is adjusted based on the weight direction.

Figure 3A:
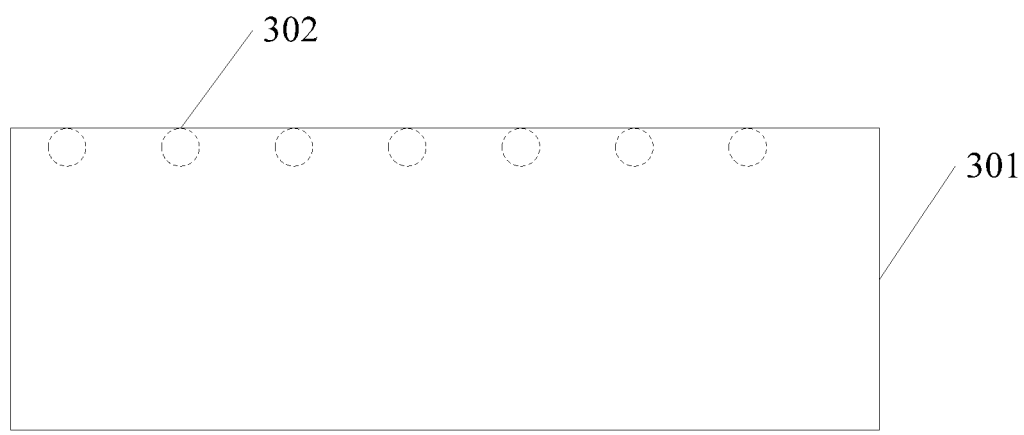
FIG. 3A and FIG. 3B are schematic diagrams of determining a display direction according to an embodiment of the invention.

Referring to FIG. 3A, multiple sensors 302, such as spatial sensors or weight sensors, are provided on the boundary of a flexible display screen 301. The amount of the sensors 302 should ensure that each region of the flexible display screen 301 can be detected. When the flexible display screen 301 is folded as the state shown in FIG. 3B, the flexible display screen 301 is divided into a first display sub-region 305, a second display sub-region 306 and a third display sub-region 307 by a first folding line 308 and a second folding line 309, where the reference numeral 303 indicates a supporting surface, i.e., the first display sub-region 305 is located on the supporting surface 303, the second display sub-region 306 stands up and is away from the supporting surface 303 by for example the height of the vertical line 304, and the third display sub-region 307 is parallel to the first display sub-region 305 and is away from the supporting surface 303 by the height of the vertical line 304.

Figure 3B:
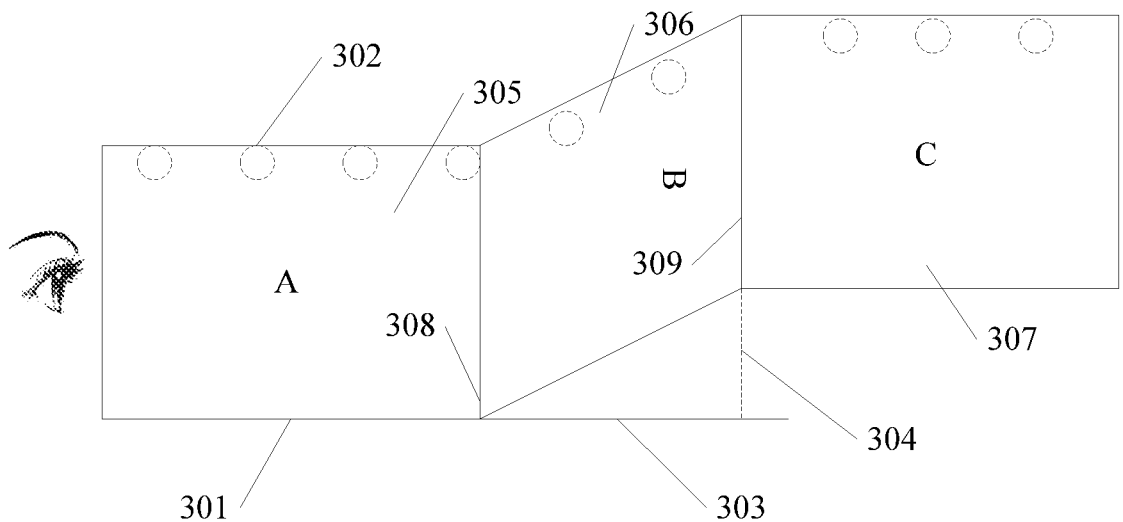

When the state shown in FIG. 3B is folded, the sensor 302 detects the variance in the weight and transmits the detected data to a processing unit of the electronic device, such as the central processing unit. The processing unit receives these data, distinguishes respective sensors in corresponding display region, and analyzes the data transmitted by the sensor in the corresponding display region, so as to determine the weight direction of the display region and then determine the display direction of the display object in the display region according to the weight direction of the display region. For example, it is determined that the display direction of the display object in the display region is consistent with the weight direction thereof. For example, the display direction of the character A in the first display sub-region 305 is shown as FIG. 3B; the display direction of the character B in the second display sub-region 306 is just perpendicular to the display direction of the character A; and similarly, the display direction of the character C in the third display sub-region 307 is identical to the display direction of the character A.

After the display direction is determined by using the above method, when the customer watches the display object on the flexible display screen 301 on the left side of the flexible display screen 301, this customer can just watch the display object in the second display sub-region 306, as shown in FIG. 3B. Because the display direction of the display object in the second display sub-region 306 just conforms to the watching customer and physiological customer of the customer, the customer nearby the lower boundary of the flexible display screen 301 can watch the display objects in the first display sub-region 305 and the third display sub-region 30 conveniently.

The embodiments in FIG. 3A and FIG. 3B are adapted to the situation in which the flexible display screen is not too big. In the case that the flexible display screen is bigger, if the sensor is only provided on the edge, some regions may not be detected, and thus another embodiment will further be provided in the following.

Figure 4A:
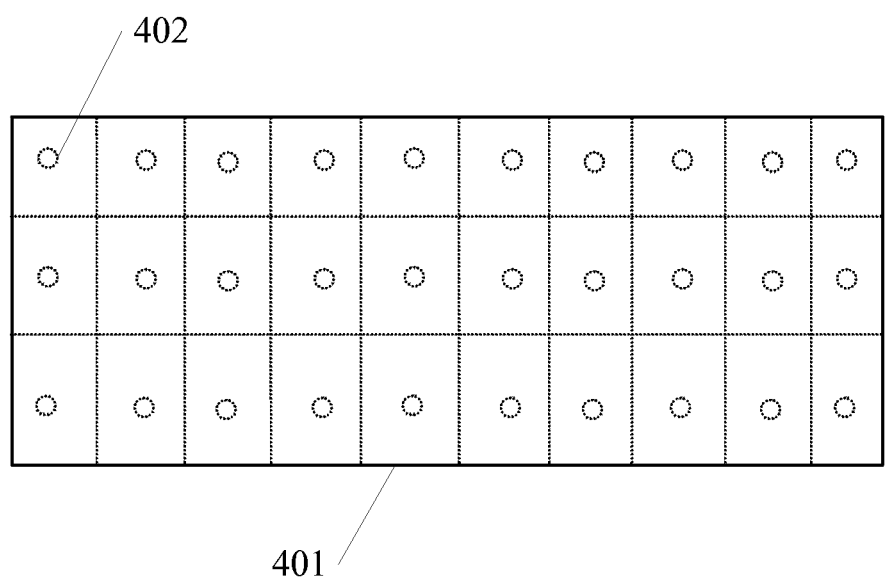
FIG. 4A and FIG. 4B are schematic diagrams of determining a display direction according to another embodiment of the invention.

As shown in FIG. 4A, the flexible display screen 401 is divided into multiple small regions, and a sensor 402, such as a weight sensor or a spatial sensor, is provided below each small region. The amount of the small regions and the amount of the sensors 402 should ensure that each region of the flexible display screen 401 can be detected.

Figure 4B:
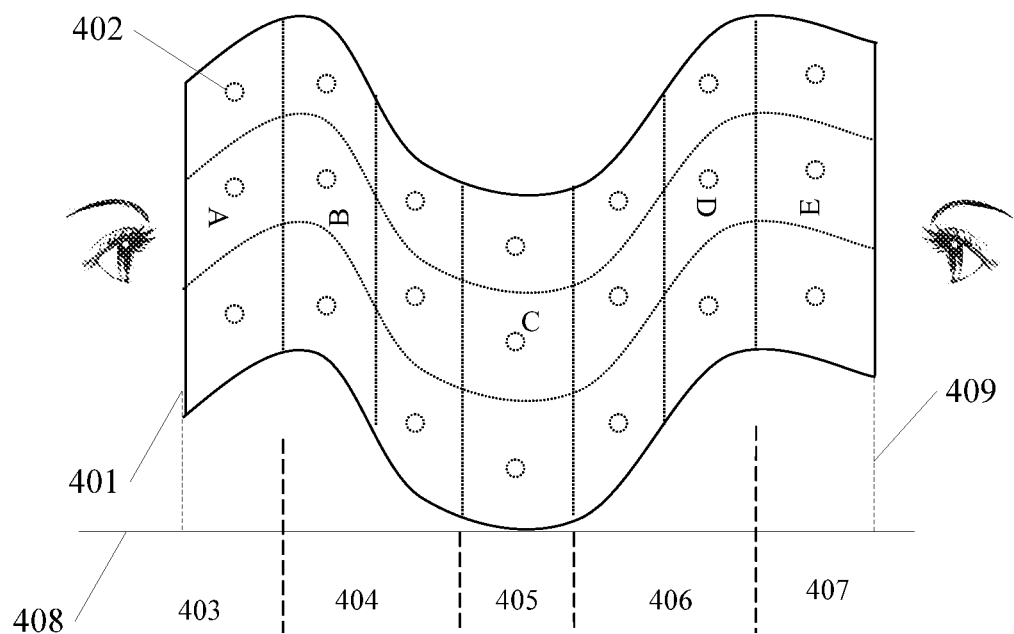

Referring to FIG. 4B, the flexible display screen 401 is folded into five display sub-regions, i.e., a first display sub-region 403, a second display sub-region 404, a third display sub-region 405, a fourth display sub-region 406 and a fifth display sub-region 407, where the reference numeral 408 indicates a supporting surface, i.e., the third display sub-region 405 is located on the supporting surface 408, the second display sub-region 404 and the fourth display sub-region 406 stand up and are away from the supporting surface 408 by the height of the vertical line 409, and the first display sub-region 403 and the fifth display sub-region 407 are also away from the supporting 408 and warp in the air.

When the state shown in FIG. 4B is folded, the sensor 402 detects the variance in the weight and transmits the detected data to a processing unit of the electronic device, such as the central processing unit. The processing unit receives these data, distinguishes respective sensors in corresponding display region, and analyzes the data transmitted by the sensor in the corresponding display region, so as to determine the weight direction of the display region and then determine the display direction of the display object in the display sub-region according to the weight direction of the display sub-region. For example, it is determined that the display direction of the display object in the display sub-region is consistent with the weight direction thereof. For example, the display direction of the character A in the first display sub-region 403 is shown as FIG. 4B, the display direction of the character B in the second display sub-region 404 is just opposite to the display direction of the character A. Similarly, the display direction of the character C in the third display sub-region 405 is perpendicular to the display direction of the character A, the display direction of the character D in the fourth display sub-region 406 is the same as the display direction of the character A, and the display direction of the character E in the fifth display sub-region 407 is the same as the display direction of the character B.

After the display direction is determined using the above method, when the customer watches the display object on the flexible display screen 401 on the left side of the flexible display screen 401, because the display directions of the display objects in the first display sub-region 403 and in the fourth display sub-region 406 just conform to the watching customer and physiological customer of the customer, this customer can just watch the display objects in the first display sub-region 403 and in the fourth display sub-region 406, as shown in FIG. 4B. Further, the customer nearby the lower boundary of the flexible display screen 401 can watch the display object in the third display sub-region 405 conveniently, and the customer on the right side of the flexible display screen 401 can just watch the display objects in the second display sub-region 404 and in the fifth display sub-region 407, because the display directions of the display objects in the second display sub-region 404 and in the fifth display sub-region 407 just conform to the watching customer and physiological customer of the customer. Therefore, only one flexible display screen can meets the requirement of multiple customers watching from different angles at the same time.

Further, the above operation of determining the display direction of the display object in the display region can be performed at any stage. For example, the adjustment function can be started when the customer wants to adjust the display direction or when a generation of a new display sub-region is detected on the first display region, where the new display sub-region is different from the original display sub-region. For example, there are the first display sub-region and the second display sub-region; and when the generation of a new display sub-region is detected, the display direction of the display object in this new display sub-region is determined using the method described in the previous embodiment.

In a further embodiment, referring to FIG. 5A to FIG. 5C, when any one or all of the first iron 501, the second iron 502, the third iron 503 and the display object 203 are displayed in the first display sub-region 206 or the second display sub-region 207, the display direction of the display object in the first display sub-region 206 is adjusted, the display direction of the display object in the second display sub-region 207 is further adjusted. For example, the display direction of the display object 203 in FIG. 2C is adjusted by taking the cutting line 208 as the top and taking the upper boundary of the electronic device as the bottom. The adjustment of the display object 203 in FIG. 5C is the same as that in FIG. 2C, but the first iron 501, the second iron 502 and the third iron 503 are adjusted from the left of the electronic device to the right of the electronic device in the original FIG. 5A, and by taking the cutting line as the top and taking the upper boundary of the electronic device as the bottom. In this way, the display direction of the first display sub-region 206 watched by a first customer and the display direction of the second display sub-region 207 watched by a second customer are the same and both comply with the display direction for the normal watching of the customer, so as to facilitate multiple customers to use this electronic device at the same time.

Figure 7A:
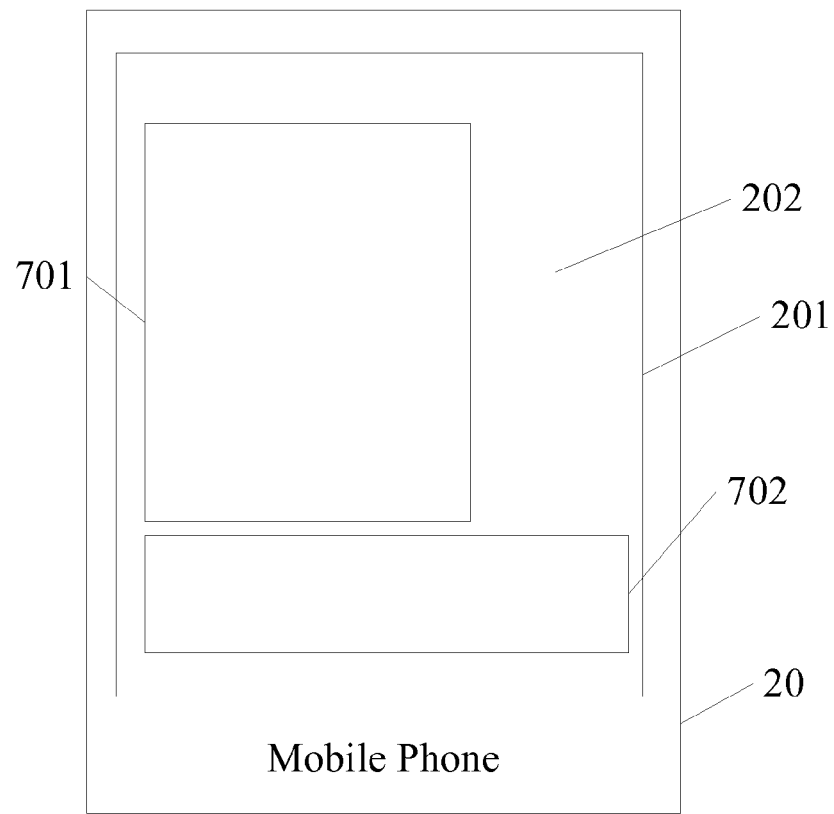
FIG. 7A and FIG. 7B are schematic diagrams of a bent electronic device according to another embodiment of the invention.
Figure 7B:
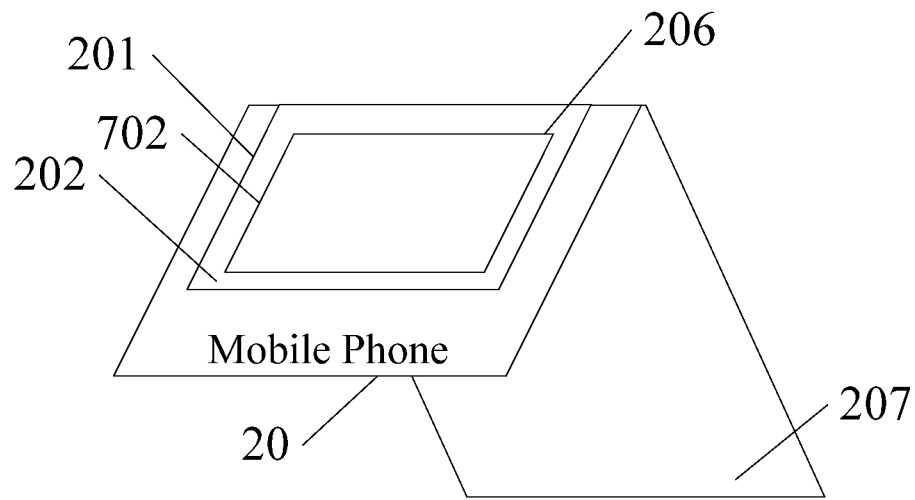

In another embodiment, referring to FIG. 7A, a first display object 701 and a second display object 702 are displayed in the first display region 202, where the size of the first display object 702 is larger than that of the second display object 702. For example, different layouts of a newspaper, some of the layouts are bigger, such as the A4 paper, and some of the layouts are smaller, such as the B5 paper. Then, referring to FIG. 7B, the first display region 202 is divided into a first display sub-region 206 and a second display sub-region 207, and the first display sub-region 206 is smaller than the second display sub-region 207. By comparing the sizes of the first display object 702, the second display object 702, the first display sub-region 206 and the second display sub-region 207, it is found that the size of the second display object 702 is for example the same as that of the B5 paper, which is just suitable for the first display sub-region 206, because the size of the first display sub-region 206 is also just the same as that of the B5 paper. Thus, the second display object 702 is displayed in the first display sub-region 206. In this way, the display object can be displayed in the display region without zooming out the display object, the customer will watch comfortably. Thus, according to the method in this embodiment, different display objects can be displayed in the first display sub-region 206 by different folding.

Figure 8A:
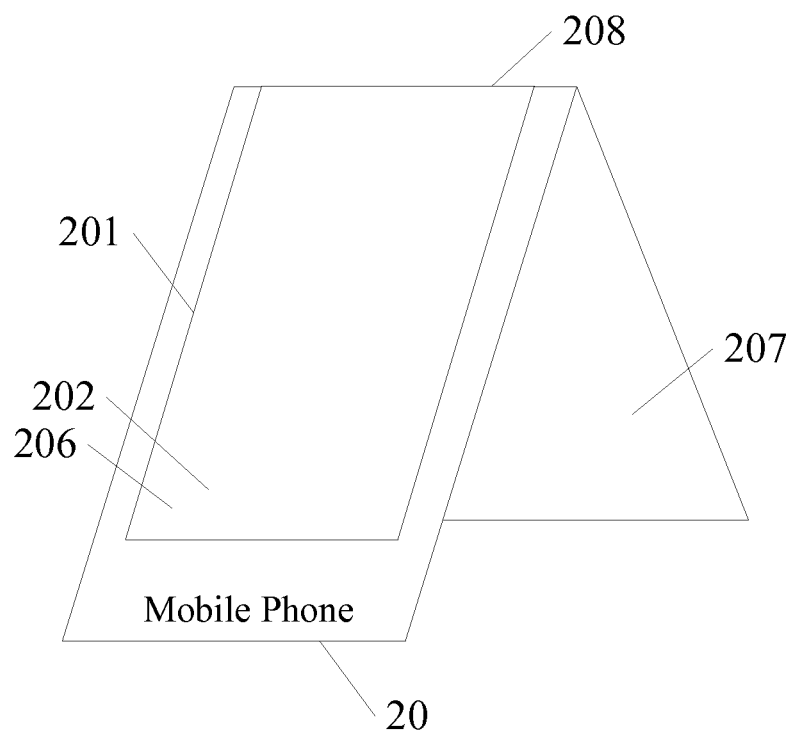
FIG. 8A and FIG. 8B are schematic diagrams of a bent electronic device according to another embodiment of the invention.
Figure 8B:
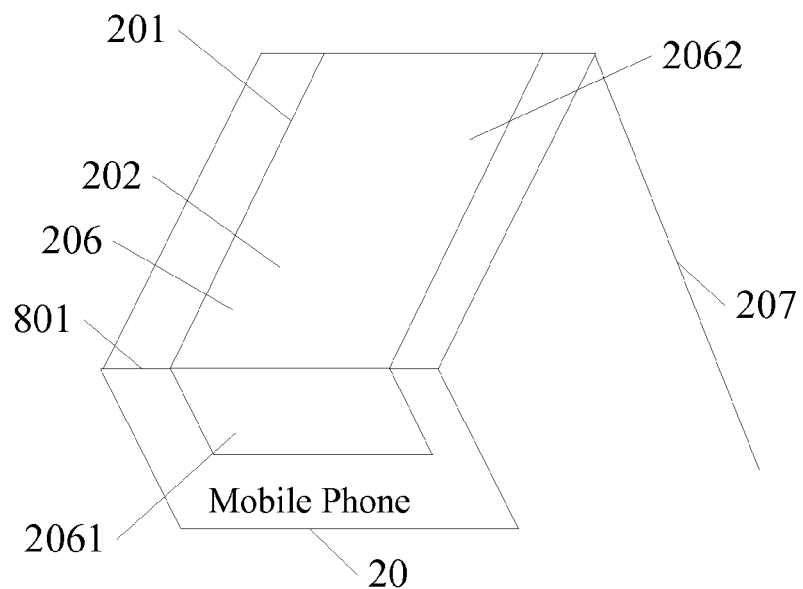

In another embodiment, the flexible display screen 201 can be folded for several times, For example, the flexible display screen 201 has been folded for the first time, referring to FIG. 8A, and the first display region 202 is divided into a first display sub-region 206 and a second display sub-region 207. When the flexible display screen 201 is folded for the second time, it is detected whether the flexible display screen 201 is folded again; if the flexible display screen 201 is folded again, it is detected whether a new cutting line is generated in the first display sub-region 206 and the second display sub-region 207, referring to FIG. 8B. For example, a new cutting line 801 is detected in the first display sub-region 206, and then the first display sub-region 206 is divided into two display sub-regions 2061 and 2062 based on the new cutting line 801. Similarly, the display sub-region can be divided by using this method every time the flexible display screen is folded, and then how the display region is divided when the flexible display screen is folded for other times will not be described in detail.

The above embodiments are given by taking the display screen being bent for once or twice as an example; however, in practice, even if the display screen is bent for several times, the processing manner is the same. Further, no matter how the display screen is folded or how many times the display screen is folded, different display contents can be displayed in the folded display sub-region based on the divided display sub-regions. For example, in the above embodiment described with respect to FIG. 2B and FIG. 5B, the display object that is displayed when the display screen has not been folded is zoomed out and then displayed in the display sub-region. However, as the embodiment described with respect to FIG. 7A and FIG. 7B, one of the display objects that are displayed on the unfolded display screen is displayed in the display sub-region with the size matched with the size of this display object, other display objects can be displayed in the display sub-regions with the size matched with that of the other display object, and thus the size of the display object is not zoomed out.

In the case of FIGS. 2B and 2C, the display object is zoomed out for display, the screen resolutions of the first display sub-region 206 and the second display sub-region 207 are still the same as that of the unfolded first display region 202. Therefore, when the display object 203 is zoomed out and displayed in the first display sub-region 206 and the second display sub-region 207, the display effect is poor due to the improper resolution, and the customer will watch uncomfortably and the customer experience is bad.

Therefore, a method for adjusting the resolution is provided according to this embodiment. By taking the first display sub-region 206 as an example, the size of the first display sub-region 206 is detected. In this embodiment, whether there is a folding line on the first display sub-region 206 is detected at first; if there is the folding line on the first display sub-region 206, such as the folding line 208, the area of the first display sub-region 206 is determined based on the folding line 208 and the boundary of the flexible display screen 201. Further, the size, such as the width and the height, of the first display sub-region 206 is detected according to the folding line 208. For example, the width of the first display sub-region 206 is Aw, and the height of the first display sub-region 206 is Ah, thus the screen size of the first display sub-region 206 is determined as A. In this embodiment, in order to set the screen resolution quickly and conveniently, a relation table between the screen size and the screen resolution is stored in a storage unit of the mobile phone 20, referring to Table 1. In other embodiments, Table 1 can be stored in other storage unit such as a portable hard drive or network hard disk. Table 1 can be obtained or acquired via a USB interface or other network interface when necessary. Further, in this embodiment, when the screen size of the first display sub-region 206 is detected as A, the corresponding optimal screen resolution is for example A1. However, in other embodiment, one screen size can support multiple screen resolutions. As shown in Table 1, the screen size A can support the screen resolution A1, the screen resolution A2, the screen resolution A3 and the screen resolution A4 which have priority level, for example, descendingly. Generally, the screen resolution is selected based on the priority level from high to low; however, in practice, different choosing strategy can be provided. When the screen size of the first display sub-region 206 is detected as B, the choosing strategy can be based on the case that the screen size is A. Similarly, the same choosing strategy can be applied at the case of screen size C. Thus, the choosing strategy can be determined referring to the screen resolution in Table 1, as long as the detected screen size of the first display sub-region 206 is in Table 1.

TABLE 1

| Screen size | Screen width | Screen Height | Resolution support |
|---|---|---|---|
| A | Aw | Ah | Resolution A1/A2/A3/A4 |
| B | Bw | Bh | Resolution B1/B2/B3/B4 |
| C | Cw | Ch | Resolution C1/C2/C3/C4 |

In another embodiment, when it is detected that the screen size of the first display sub-region 206 is not in Table 1, a screen size that is approximate to the actual screen size of the first display sub-region 206 can be found in Table by comparing the actual screen size of the first display sub-region 206 and the screen sizes recorded in Table. The screen resolution corresponding to this screen size is set, for example, by comparing the differences between the actual screen size and the screen size in Table, and the smallest difference indicates the approximate screen size.

In another embodiment, when it is detected that the screen size of the first display sub-region 206 is not in Table 1, the customer may be promoted to set the resolution by himself/herself. The promotion content can be for example that "the screen size of the first display sub-region 206 is A, please input the screen resolution". The customer can user-define the screen resolution after seeing this promotion message, which is very convenient.

Practically, in another embodiment, when it is detected that the screen size of the first display sub-region 206 is not in Table 1, the screen resolution of the first display sub-region 206 can be set as a default value, such as the resolution A1.

In another embodiment, the resolution can be configured by the customer directly according to the screen size of the first display sub-region 206, rather than using Table 1. In this way, the customer can set the resolution as required. For example, if the customer wishes a lower screen resolution of the first display sub-region 206, he/she can set this resolution lower.

In another embodiment, the size of the second display sub-region 207 is further detected, and then a corresponding screen resolution is set for the second display sub-region 207 based on the size of the second display sub-region 207. The specific method for setting a screen resolution is the same as that described above with respect to the first display sub-region 206, which will not be described in detail herein.

Further, the above operation of setting a screen resolution for the display sub-region can be performed at any stage. For example, the adjustment function can be started when the customer wants to adjust the resolution. Alternatively, a generation of a new display sub-region is detected on the first display region 202, where the new display sub-region is different from the first display sub-region 206 and the second display sub-region 207, and when the generation of a new display sub-region is detected, a screen resolution is set for this new display sub-region by using the method described in the previous embodiment.

Further, the electronic device provided by the embodiment of the invention has an interaction mode. In the interaction mode, a first sub-region and a fourth sub-region are generated on the first display sub-region, and a second sub-region and a third sub-region are generated on the second display sub-region, the first sub-region corresponds to the second sub-region, and the third sub-region corresponds to the fourth sub-region. The method includes: receiving a first input operation in the first sub-region of the first display sub-region, where the first input operation corresponds to a first display object; and displaying the first display object in the second sub-region of the second display sub-region. Further, after the displaying the first display object in the second sub-region of the second display sub-region, the method further includes: receiving a second input operation in the third sub-region of the second display sub-region, where the second input operation corresponds to the second display object; and displaying the second display object in the fourth sub-region of the first display sub-region.

For example, the customer inputs "7+8=" in the first sub-region of the first display sub-region, the system of the electronic device obtains the display content "7+8=", and determine whether the display content "7+8=" is located in the first sub-region of the first display sub-region. If the display content "7+8=" is the display content in the first sub-region of the first display sub-region, an input obtaining module of the electronic device obtains the display content "7+8=" input by the customer in the first sub-region and transmits the display content "7+8=" to a sync transmission module of the electronic device. The sync transmission module transmits the display content "7+8=" synchronously to a sync obtaining module, and the sync obtaining module transmits the display content "7+8=" to the second sub-region of the second display sub-region. The second display sub-region displays the display content "7+8=" synchronously in the second sub-region of the second display sub-region according to the display content "7+8=". In other words, a first customer inputs the display content "7+8=" in the first sub-region, where the input process of the display content "7+8=" is the first input operation. The input process of the display content "7+8=" is performed simultaneously in the first sub-region and the second sub-region in real time.

The technical solution of the application will be further described in conjunction with the drawings and the embodiment in the following.

Figure 9:
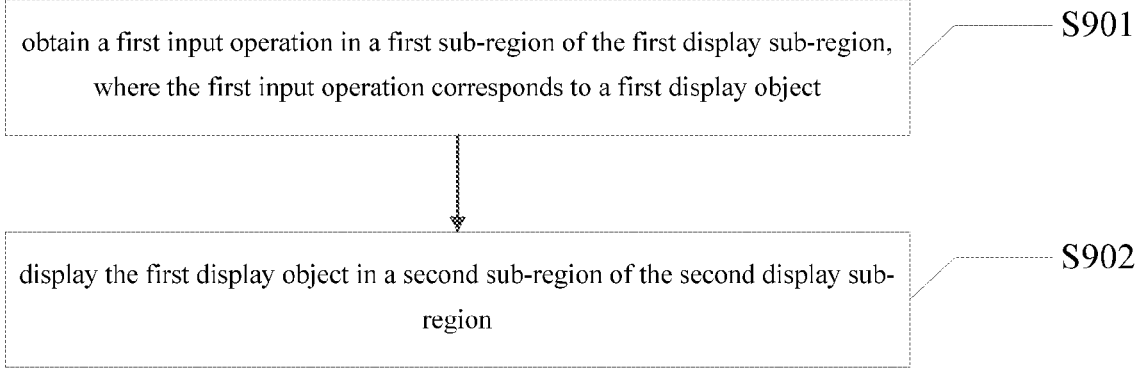
FIG. 9 is a flowchart of a display method of an electronic device according to the invention.

As shown in FIG. 9, which shows a flowchart of a display method according to the application, and the method includes the following steps.

Step S901, obtaining a first input operation in a first sub-region of the first display sub-region, where the first input operation corresponds to a first display object.

Before the electronic device receives the first input operation in the first sub-region of the first display sub-region, the customer firstly inputs a sub-region setting instruction for defining an input region of the display screen of the electronic device for performing a sync display. For example, the customer can use a region selecting tool to select a corresponding region on the display screen of the electronic device as the first sub-region. This sub-region setting instruction can also be that the customer selects a corresponding region as the first sub-region of the first display sub-region by a touch operation. For example, the customer draws a circle with two fingers in the first display sub-region, and the electronic device determines the generation of the sub-region setting instruction by obtaining the information of the two fingers. After receiving the sub-region setting instruction, the electronic device determines the coordinate range of the display region that is defined in the first display sub-region according to the sub-region setting instruction input by the customer, and determines the first sub-region of the first display sub-region based on the coordinate range of this region. In this way, the customer can input the first input operation in the first sub-region, where the first input operation corresponds to the first display object.

Further, a pressure sensor is provided on the screen of the electronic device. The pressure sensor obtains in real time a knocking position on the screen after the display region setting function of the screen is started by the customer. If the customer knocks four different positions on the screen, the pressure sensor will obtain the knocking position information of the four points. The electronic device connects the corresponding coordinate positions according to the knocking position information and then generates a first sub-region. Then, in this way, the customer can generate a second sub-region on the screen. Meanwhile, the customer can set the sub-region on another screen by using the above method.

Further, in the electronic device of the application, an image pick-up apparatus can be provided, and the display screen includes a first display sub-region and a second display sub-region, both of which are provided with the image pick-up apparatus. When the first customer operates on the first display sub-region, the image pick-up apparatus in the first display sub-region collects biological feature information of the first customer; and when the second customer operates on the second display sub-region, the image pick-up apparatus in the second display sub-region collects biological feature information of the second customer. The feature information includes biological feature information, such as the facial information, the iris information. When the first customer or the second customer needs to enable the interaction between the two screens, the electronic device compares the data collected by the image pick-up apparatus. In the case that the biological feature information of the first customer is different from that of the second customer, the electronic device will generate a first sub-region on the first display sub-region and generate a second sub-region on the second display sub-region.

Further, a biological feature sensor is further provided in the electronic device according to the present application, which can be a fingerprint sensor. When the first customer operates on the first display sub-region, the first fingerprint sensor provided on the first display sub-region obtains first fingerprint information of the first customer, where the first fingerprint information can be fingerprint information of one finger, and can also be the fingerprint information of multiple fingerprints. When the second customer operates on the second display sub-region, the second fingerprint sensor provided on the second display sub-region obtains the second fingerprint information of the second customer. When the first customer or the second customer needs to enable the interaction between the two screens, the electronic device compares the obtained first and second fingerprint information. In the case that the first fingerprint information is different from the second fingerprint information, the electronic device will generate a first sub-region on the first display sub-region and generate a second sub-region on the second display sub-region.

Step S902, displaying the first display object in the second sub-region of the second display sub-region.

The electronic device includes the first display sub-region and the second display sub-region, and the first display sub-region is independent of the second display sub-region.

Thus, after the first sub-region of the first display sub-region is determined in step S901, if the customer enables a content share program of the electronic device, the electronic device obtains the first display object that is input by the customer in the first sub-region of the first display sub-region. At this time, the input obtaining module of the electronic device obtains the first display object that is input by the customer in the first display sub-region and transmits the first display object to the sync transmission module of the electronic device. The sync transmission module transmits the first display object to the sync obtaining module, and the sync obtaining module transmits the first display object to the second sub-region of the second display sub-region for display. Thus, after the content share program is enabled, the sync module of the electronic device transmits synchronously the display object in the first sub-region to the second sub-region of the second display sub-region for display.

For example, when the customer who operates on the electronic device needs to display the input display content on the display screen of another customer, the customer will enable the display content share program, and the customer inputs "7+8=" in the first sub-region of the first display sub-region. The system of the electronic device obtains the display content "7+8=", and determine whether the display content "7+8=" is located in the first sub-region of the first display sub-region. If the display content "7+8=" is the display content in the first sub-region of the first display sub-region, the input obtaining module of the electronic device obtains the display content "7+8=" that is input by the customer in the first sub-region and transmits the display content "7+8=" to the sync transmission module of the electronic device. The sync transmission module transmits the display content "7+8=" synchronously to the sync obtaining module. The sync obtaining module finally transmits the display content "7+8=" to the second sub-region of the second display sub-region. The second display sub-region displays the display content "7+8=" synchronously in the second sub-region of the second display sub-region according to the display content "7+8=".

The displaying of the display content in the second sub-region of the second display sub-region in the application will be described in detail in conjunction with a specific embodiment in the following.

Figure 10:
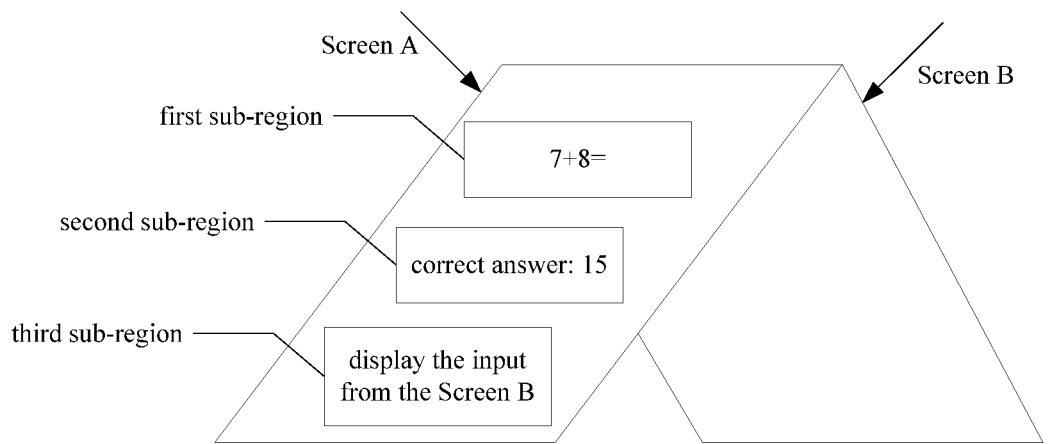
FIG. 10 is a schematic diagram of an interaction of an electronic device according to the invention.
Figure 11:
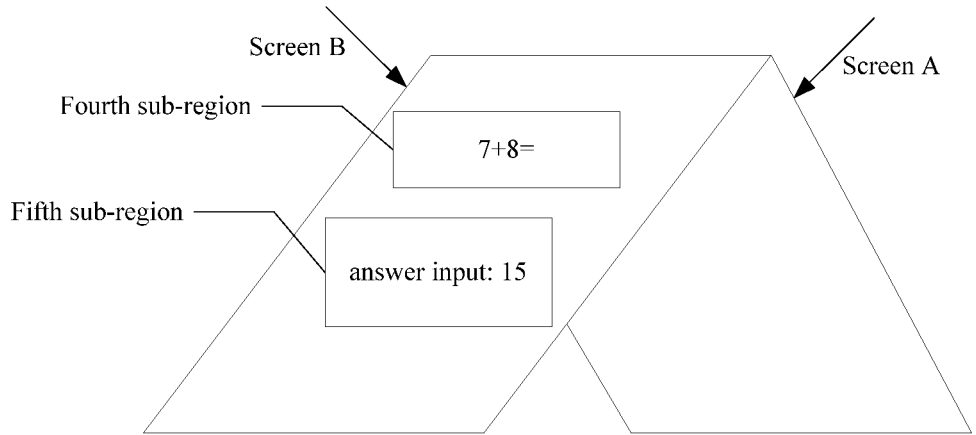
FIG. 11 is a schematic diagram of an interaction of an electronic device according to the invention.

For example, as shown in FIG. 10, the first customer inputs content in the first display sub-region of the electronic device. The first display sub-region of the electronic device is the screen A, and three sub-regions (which are provided by using the above method for providing sub-region, which will not be described in detail here) are provided on the screen A. A first sub-region is a sync display region, that is to say, the content that is input by the customer in the first sub-region of the screen A can be displayed in the fourth sub-region of the screen B. In FIG. 10, after the content "7+8=" is input by the first customer in the first sub-region, the system in the electronic device obtains the display content "7+8=" and determines that the input operation corresponding to the display content "7+8=" is located in the first sub-region of the screen A. If the input operation is the input operation in the first sub-region, the input obtaining module of the electronic device obtains the content "7+8=" that is input by the customer in the first sub-region, and transmits the content "7+8=" to the sync transmission module of the electronic device. The sync transmission module transmits the content "7+8=" to the sync obtaining module. Finally, the sync obtaining module transmits the content "7+8=" to the fourth sub-region of the screen B for display, and the screen B displays synchronously the content "7+8=" in the second sub-region of the second display sub-region based on the display content "7+8=" (as shown in FIG. 11).

That is to say, when the first customer inputs the display content in the first sub-region of the screen A, the display content that is input by the first customer to the first sub-region is synchronously displayed in the first sub-region and the fourth sub-region of the screen B.

Further, in the same way, after obtaining the display content of the fourth sub-region, a second customer inputs the answer of the question "15" in the fifth sub-region of the screen B. Meanwhile, the content that is input by the second customer to the fifth sub-region is displayed synchronously in the third sub-region of the screen A.

Further, a display content in the second sub-region of the screen A is the content that is not synchronously displayed. When the first customer inputs the display content to the second sub-region of the screen A, the electronic device will obtain the second display content in the second sub-region, and determine whether the second display content is located in the second sub-region. If the second display content is located in the second sub-region, the second display content can only be displayed on the screen A, so that the first customer determines whether the display in the third sub-region is correct by comparing the content displayed in the third sub-region and the content displayed in the second sub-region.

Practically, if the customer performs the second input operation on the sub-region of the display screen, the electronic device determines whether the second input operation is located in the sub-region of the display region and generates a determination result. If the determination result is that the second input operation is located outside the sub-region, the electronic device displays the second input operation in the region other than the sub-region; or the electronic device does not respond to the second input operation. Thus, the input operation outside the sub-region will cause no influence on the display in the sub-region.

Further, when the customer performs an input operation on the display screen, the electronic device determines that a part of the input operation of the customer is in the sub-region and the other part of the input operation of the customer is not in the sub-region. In this case, the electronic device displays synchronously the input operation in the sub-region and displays the other part of the input operation outside the sub-region only on the display screen.

Figure 12:
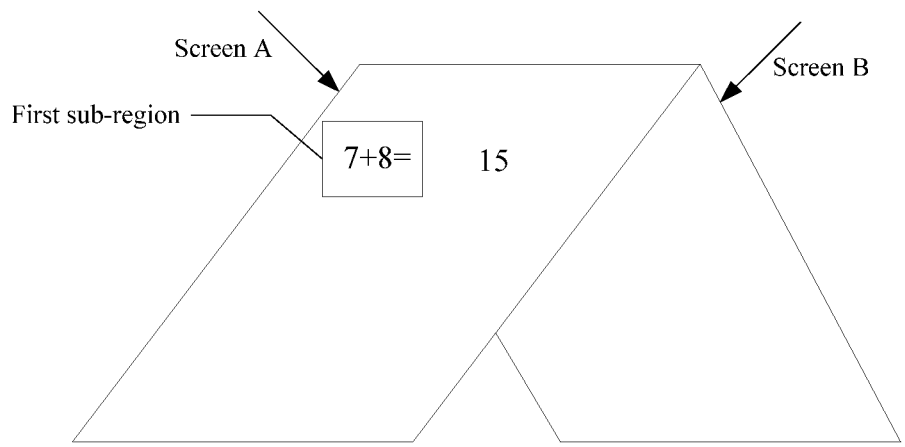
FIG. 12 is a schematic diagram of an interaction of an electronic device according to the invention.
Figure 13:
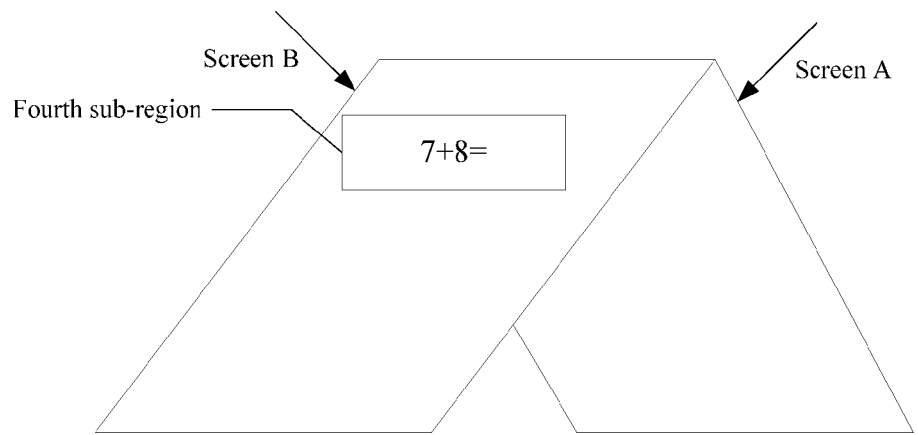
FIG. 13 is a schematic diagram of an interaction of an electronic device according to the invention.

For example, as shown in FIG. 12, the electronic device includes an screen A and a screen B, and a first sub-region of the screen A and a fourth sub-region of the screen B are sync sub-regions. The customer performs an operation on the screen A. The operation of the customer is divided into two parts, that is, a first operation corresponding to the first display object "7+8=", and a second operation corresponding to the second display object "15". In this case, the electronic device obtains the first and second operations that are input by the customer and determines whether the first and second operations are located in the first sub-region. Because the first operation is located in the first sub-region, the first display object "7+8=" is displayed in the first sub-region; and the first display object is displayed synchronously in the fourth sub-region of the screen B (as shown in FIG. 5), while the first display object is displayed in the first sub-region of the screen A. However, the second operation is not located in the first sub-region, and thus the second display object "15" can only be displayed on the screen A but not displayed synchronously on the screen B (as shown in FIG. 13).

Moreover, it is further provided a method for controlling a sync display of a display object by a control character according to an embodiment of the application. Specifically, after the first sub-region of the first display sub-region is provided as the sync sub-region, if the customer hopes that a part of the content in the first sub-region is displayed in the second sub-region of the second display sub-region, the customer only needs to add a specific character ahead at the front of the content that is not to be displayed synchronously. For example, when the customer input "7+8=15" in the first sub-region, and hopes to display "15" synchronously in the second sub-region of the second display sub-region, the customer adds a specific character, such as "/?", at the front of the input "15". After the electronic device obtains the character "/?" that is input by the customer in the first sub-region, the input obtaining module of the electronic device will not obtain the content after the character "/?". Thus, the result input in the first sub-region is "7+8=/? 15", and at this time, "15" will not be displayed in the second sub-region of the second display sub-region, and the content that is displayed in the second sub-region of the second display sub-region is "7+8=". Thereby, the customer can determine whether to perform the sync display in the same sub-region.

In the embodiment of the application, only the interaction of questions and answers between two screens is given. The technical solution of the application can be applied to other interaction among multiple screens practically, and the content of the interaction can be set according to the requirement of the customer, which can be entertainment, office, information transmission, or other interaction.

In the application, whether the display content displayed on the first screen is displayed on other screens can also be determined by control character. The specific step is as follows.

When the computer is used by the customer, the computer includes a first display screen and a second display screen. The first display screen is a separate physical display screen, and the second display screen is another separate physical display screen; or the first display screen corresponds to the first display sub-region of the folded screen, and the second display screen corresponds to the second display sub-region of the folded screen.

When the customer needs to display the display content that is displayed on the first display screen synchronously on the second display screen, the customer enables a sync display apparatus in the electronic device. The sync display apparatus includes an input obtaining module, a sync transmission module, a sync obtaining module and a sync display module. A specific character for enabling the sync display apparatus, such as "/*", "/?", or "/%", is provided in the electronic device. A character is adopted in the embodiment of the application.

After the customer inputs "/?" in the first display sub-region of the first display screen, the electronic device obtains the character "/?" that is input by the customer, and enables the corresponding sync display apparatus according to the character "/?". Once the customer inputs corresponding display content "7+8=" after the specific symbol, that is to say, the input content is "/? 7+8=" (other input format can be performed by the customer, which will not be described in detail here), the input obtaining module of the electronic device will obtain the sync display content "7+8=", and transmit the sync display content "7+8=" to the sync transmission module. The sync transmission module transmits the sync display content "7+8=" to the sync display module, the sync display module transmits the sync display content "7+8=" to the second display screen for display. That is to say, after the specific character "/?" is input onto the first display screen, the display content is displayed on the first display screen while the display content is displayed on the second display screen.

Further, the embodiment of the invention is not limited to using "/?" as the output indicator, as long as the corresponding relation between an output indicator and the output instruction is set after the any character is selected as the output indicator.

Further, in the embodiment of the application, the sync display content can be selected by the customer using a control character as follows.

Firstly, the electronic device obtains the specific character that is input by the customer in the first display sub-region. The specific character can be configured by an operating system drive program (such as the touch screen input drive, keyboard input drive or the like) or the user software, and be identified by the drive program. When the customer performs the input in the first display sub-region, after the specific character is detected, the drive program obtains the first display content that is input by the customer into the first display sub-region according to the meaning of the specific character. The first display content is transmitted to the second display sub-region for display. For example, in the case that "/?" indicates that the sync content start, when "/? 56+89=1*" is input, the system detects the first display content is "56+89=", the first display content is transmitted to the second display sub-region for sync display. A specific sync ending symbol "/*" is further included after the first display content "56+89=". Thus, after the first display content "56+89=" is displayed, other content that is input by the customer into the first display sub-region will not be displayed. Some contents which are not to be synchronized can be remarked by the control character. For example, "%" indicates the non-sync. If "1% private information is non-sync" is input, the character string "private information is out-sync" will not be synchronized automatically.

In this embodiment, the specific sync display content can be selected by the customer using the control character, so that the sync display will be more accurate, and various requirements of the customer on the display content synchronization are achieved.

Another embodiment is further provided in the application. Specifically, the electronic device is connected to a flexible display screen and includes a first system and a second system. When the customer needs to divide the flexible display screen into two separate display regions, the customer bends the flexible display screen. When the flexible display screen meets the preset condition, the flexible display screen is divided into a first display sub-region and a second display sub-region, where the first system corresponds to the first display sub-region, the second system corresponds to the second display sub-region, and a data channel is provided between the first system and the second system.

When the electronic device obtains a first operation of the customer on the first display sub-region, the electronic device transmits the first display object corresponding to the first operation to the second system via the data channel between the first system and the second system, and the second system displays the first display object on the second display sub-region, where the first display object is displayed synchronously on the second display sub-region. That is to say, the first display object that is input by the customer is obtained, while the first system transmits the first display object to the second system.

In the application, with the setting of the display region and the use of the control character, the display content on the display screen can be displayed or not displayed on another display screen as required. Alternatively, the display content in the first display sub-region is displayed synchronously or asynchronously on the second display sub-region, so as to achieve the sub-region display on the screen. Therefore, the interaction process of multiple customers is displayed, the display efficiency of the screen is improved, the service efficiency of the electronic device is improved and the requirement of the customer on the sub-region display is satisfied.

Figure 14:
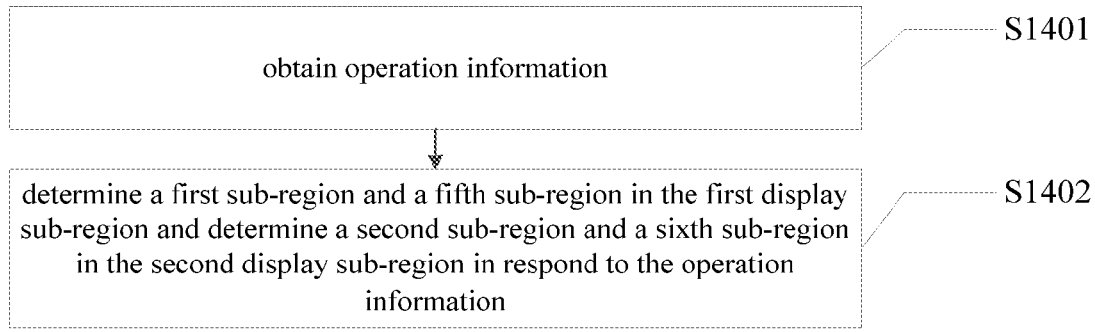
FIG. 14 is a flowchart of a display method of an electronic device according to the invention.
Figure 15:
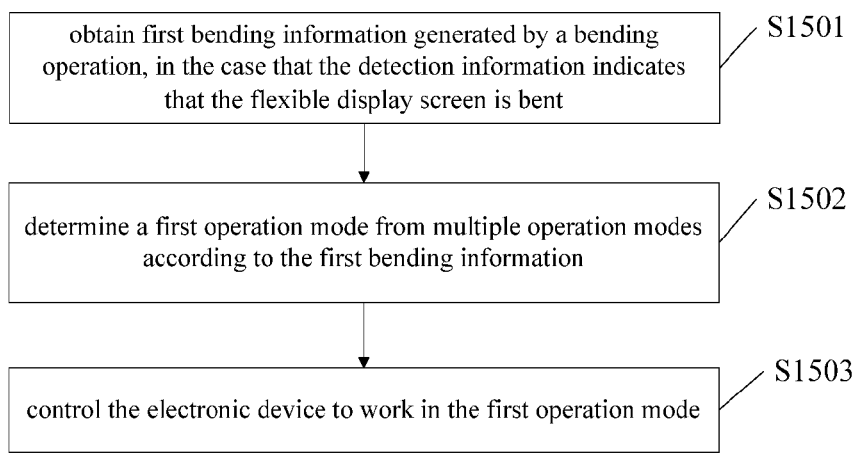
FIG. 15 is a flowchart of a method for controlling an electronic device according to the invention.

In another embodiment, when connected to a display screen, the electronic device includes a first display sub-region and a second display sub-region which are independent of each other. The method is shown in FIG. 14, which includes the following steps.

Step S1404, obtaining operation information.

The customer divides the display screen according to the operation information.

Step S1402, determining a first sub-region and a fifth sub-region in the first display sub-region, and determining a second sub-region and a sixth sub-region in the second display sub-region in response to the operation information.

When the customer needs to divide the first display sub-region and the second display sub-region of the electronic device into sub-regions for display, the electronic device will obtain the operation information, determines the first sub-region and the fifth sub-region in the first display sub-region and determines the second sub-region and the sixth sub-region in the second display sub-region according to the operation information. The specific screen region dividing manner has been described in the above embodiments of the application, which will not be described in detail here. That is to say, after the operation information for dividing regions is received, the first display sub-region will generate automatically the first sub-region and the fifth sub-region, and the second display sub-region will generate automatically the second sub-region and the sixth sub-region.

When the first customer inputs the first input operation into the first sub-region of the first display sub-region, and the first input operation corresponds to the first display object, the electronic device will determine whether the first input operation is located in the first sub-region; if the first input operation is located in the first sub-region, the electronic device displays the first display object corresponding to the first input operation synchronously in the second sub-region of the second display sub-region.

If the first input operation is not located in the first sub-region, the electronic device displays the first display object corresponding to the first input operation outside the first sub-region, and will not display the first display object corresponding to the first input operation synchronously in the second sub-region. Practically, if a part of the first input operation is in the first sub-region, the other part of the first input operation is not in the first sub-region, the part of the first input operation in the first sub-region corresponds to the first display object, and the other part of the first input operation outside the first sub-region corresponds to the second display object, the electronic device will display the first display object in the first sub-region, and display the first display object in the second sub-region synchronously. But the second display object will only be displayed in the first display sub-region, but not displayed in the second display sub-region synchronously.

After the content is displayed in the second sub-region of the second display sub-region, the second customer needs to answer the display content in the second sub-region. At this time, the second customer performs a third operation on the sixth sub-region, and the third operation corresponds to the third display object. The electronic device will obtain the third operation, and determine whether the third operation is located in the sixth sub-region; if the third operation is located in the sixth sub-region, the electronic device displays the third display object corresponding to this input operation in the fifth sub-region of the first display sub-region.

Further, when the customer inputs private information in the first display sub-region, the customer does not hope to display synchronously the private information, and then customer needs to input a corresponding second instruction for canceling the sync display. When receiving the second instruction input by the customer, the electronic device will cancel the sync display. In this case, the content that is input to the first display sub-region will not be displayed synchronously on other display regions of the display screen. The second instruction can be a specific control character, such as "/?" or "/@", or can be a voice control or touch gesture of the customer on the touch screen.

For example, the electronic device is connected to the flexible display screen. When the flexible display screen is bent, the flexible display screen is divided into two display sub-regions based on the position of the bending. When the customer inputs "it needs to work overtime tonight" in the first display sub-region, the electronic device will obtain the display content that is input by the customer to the first display sub-region, and determine whether the display content is input to the first display sub-region. When it is determined that the display content is input to the first display sub-region, the electronic device transmits the display content "it needs to work overtime tonight" to the second display sub-region, thus the display content is synchronously displayed in the second display sub-region. The so-called sync display means that when the customer inputs one word in the first display sub-region, this word will be displayed in the second display sub-region. Of course, this embodiment is just an example, but not meant to limit the application.

Further, the customer inputs "it needs to work overtime tonight" in the first display sub-region, together with the specific work time, but the customer hopes that the specific work time will not be displayed in the second display sub-region. That is to say, the customer inputs "it needs to work overtime tonight, and the work time is 8:00-11:00." in the first display sub-region, but the customer does not hope that "the work time is 8:00-11:00" is displayed in the second display sub-region. In this case, the customer only needs to input, before "the work time is 8:00-11:00", a specific character which is preset in the electronic device and used to cancel the sync display. The specific input manner is "it needs to work overtime tonight, /? and the work time is 8:00-11:00.", and then the display content after the specific character "/?" will not be displayed in the second display sub-region, so as to avoid the leakage of the important information of the customer.

In this embodiment, the customer can perform the region division in the same display screen, and performs the sync display on the divided region, so as to achieve the sync sharing of the display content and improve the utilization rate of the display screen significantly.

Further, in the prior, in order to ensure the privacy, safety and independence of each customer using an electronic device, each customer needs to have his/her own account, and saves the data and configuration in his/her account, thus it is inconvenient for use. To solve such problems, a method for controlling the electronic device is provided in another embodiment of the invention, and the method further includes the following steps.

Step S1501, obtaining first bending information generated by a bending operation, when the detection information indicates that the flexible display screen is bent;

Step S1502, determining a first operation mode from multiple operation modes according to the first bending information; and Step S1503, controlling the electronic device to work in the first operation mode.

Step S1501 specifically includes: for example obtaining a bending position, a bending manner, or a bending order of the flexible display screen or a combination of the above.

Further, the operation mode in this embodiment is the operation mode in a broad sense, for example can be a standby mode, a power-off mode, or a normal operation mode, can also be an office mode, a mobile phone mode, or an entertainment mode. In addition, the operation mode can be different customer configuration, and can also be different operation system or the like.

In order that those skilled in the art understand the invention better, the invention will be described in conjunction with specific embodiments. By taking the bar phone as an example of the electronic device, not only the display screen but also the other parts of the bar phone are flexible, so that the bar phone can be bent with the bending of the flexible display screen.

Figure 16A:
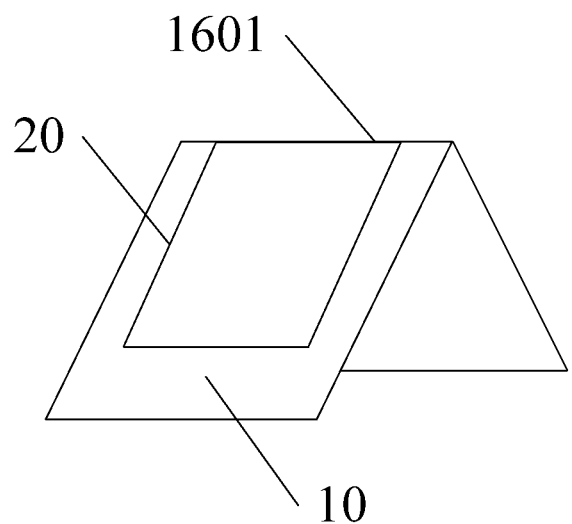
FIG. 16A and FIG. 16B are schematic diagrams of determining an operation mode according to an embodiment of the invention.

When the mobile phone is in the power-on state but not be bent, the mobile phone is bent for one time, and a first bending operation on the flexible display screen is obtained in step S1501. Referring to FIG. 16A, the mobile phone 10 is bent for one time, then the bending of the mobile phone 10 can be detected by a detection apparatus such as a sensor, and the bending information generated by this bending operation is obtained based on this bending operation. In this embodiment, the bending information is a position of the folding, the operation mode is different customer configuration. Namely, the mobile phone 10 has one hardware platform (such as an ARM11 platform) and an operation system (such as an Android system), one mobile phone 10 is used by multiple customers, and different accounts are entered into by different bending operations, i.e., the mobile phone 10 operates in the customer operations of different customers. The mobile phone 10 can detect the position of the folding line 1601 on the mobile phone 10 by the sensor (when only the flexible display screen of the mobile phone is flexible and foldable, the position of the folding line on the flexible display screen is detected). For example, when it is detected that the folding line 1601 is at the middle position of the mobile phone 10, i.e., the folding line just divides the mobile phone 10 into two equal parts, it is determined that this position corresponds to the customer configuration of the first customer according to the bending information. Then, step S1503 is performed, the mobile phone 10 is controlled to operate in the customer configuration of the first customer.

Further, when the mobile phone 10 operates in the customer operation of the first customer, the display region of the flexible display screen 20 will perform the display in the display region determined after the bending. Referring to FIG. 16A again, the mobile phone 10 is bent for one time, the flexible display screen 20 is divided into two display parts with respect to the folding line 1601, and then the display region is only a part of the original display region of the flexible display screen 20. In another embodiment, when the mobile phone 10 operates in the customer operation of the first customer, the first customer can restore the mobile phone 10 to its original state, and then the display will be performed in the whole screen of the flexible display screen 20. This is because that when the mobile phone 10 is restored to its original state from the folding state, no bending information is detected on the mobile phone 10, no other customer configuration exists, thus the mobile phone 10 continues to operate in the customer configuration of the first customer, and the display will be performed on the whole screen.

Further, when no corresponding customer configuration is founded according to the position of the folding line 1601 of the mobile phone 10 in step S1502, the customer may be prompted to set, the customer can choose to set or to perform any other operation, such as another bending operation.

Figure 16B:
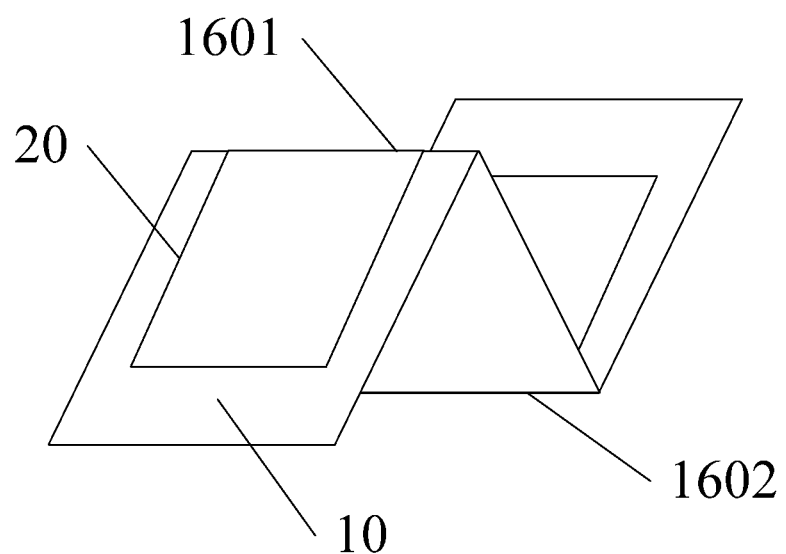

The invention will be further described in conjunction with another embodiment. Referring to FIG. 16B, when no bending operation is performed on the mobile phone 10, the mobile phone 10 detects that the mobile phone 10 is bent by a detection apparatus such as a sensor, the bending information is obtained according to this bending operation. In this embodiment, the bending position of the mobile phone 10 can be obtained based on the folding lines 1601 and 1602. For example, the folding line 1601 is located at the middle position of the mobile phone 10, i.e., the folding line 1601 divides the mobile phone 10 into two equal parts, and the folding line 1602 is located at the one third position of the mobile phone 10. The corresponding customer configuration is determined as the customer configuration of the second customer according to these bending positions, and thus the mobile phone 10 is controlled to operate in the customer configuration of the second customer.

During implementing the embodiment of FIG. 2B, the bending of the mobile phone 10 generates a folding line 1601 which has the same position as that of the folding line 1601 in FIG. 16A, that is, at the middle position of the mobile phone 10. In this case, in order to prevent the mobile phone 10 from operating directly in the customer configuration of the first customer, it is determined whether new bending information is generated in a predetermined time after the position of the folding line 1601 is determined. This predetermined time, such as 10 seconds, can be set by the customer. If no new bending information is generated when 10 seconds elapsed, the mobile phone 10 is controlled to operate in the customer configuration of the first customer. If a folding line 1602 is detected in 10 seconds and the position of the folding line 1602 is determined, the corresponding customer configuration is determined as the customer configuration of the second customer according to the positions of the folding line 1601 and the folding line 1602, and the mobile phone 10 is controlled to operate in the customer configuration of the second customer.

In another embodiment, when the electronic device operates in the first operation mode, it is determined whether new bending information is generated. If the new bending information is generated, a second operation mode is determined from the multiple operation modes, and the electronic device is switched from the first operation mode to the second operation mode, in which the second operation mode is different from the first operation mode.

According to the above example, continuously when the mobile phone 10 operates in the customer configuration of the first customer in the embodiment of FIG. 16A and the customer folds the mobile phone 10 once again, a folding line 1602 is generated, and the position of the folding line 1602 is determined. Then, the customer configuration of the second customer is determined according to the position of the folding line 1602, and thus the mobile phone 10 is controlled to switch from the customer configuration of the first customer to the customer configuration of the second customer.

In contrast, when the mobile phone 10 operates in the customer configuration of the second customer in the embodiment of FIG. 16B, the customer unfolds the mobile phone 10 along the folding line 1602, i.e., the folding line 1602 disappears. In this case, new folding information is detected by the mobile phone 10, i.e., there is only the folding line 1601 and its position information, and then it is determined that the new folding information corresponds to the customer configuration of the first customer. Thus, the mobile phone 10 is controlled to switch from the customer configuration of the second customer to the customer configuration of the first customer.

Practically, when the mobile phone 10 operates in the customer configuration of the second customer in the embodiment of FIG. 16B, the mobile phone 10 is restored to its original state, i.e., there is no new folding information, then the mobile phone 10 remains the customer configuration of the second customer, and the display is performed on the whole screen. Practically, in another aspect, after the mobile phone 10 is restored to its original state, there is no folding information and no other corresponding customer configuration, and therefore the mobile phone 10 continues to keep the customer configuration of the second customer and no switch is performed.

In the above embodiments, the description is given by taking how to restore the operation mode as an example. However, in practice, the operation mode needs to be set at first as follows.

Step A: receiving an operation mode (such as customer configuration) setting request.

Step B: detecting a bending operation of the flexible display screen based on the operation mode setting request to generate bending information (such as a position of the bending).

Step C: recording the bending information if the bending information exists and is not repeated, and corresponding the bending information to the current customer.

Step D: saving a current operation mode (such as customer configuration including type font, screen display and voice, application configuration and the like).

Further, if the bending information does not exist, or the bending information is repeated, the customer is prompted to bend the flexible display screen once again, and the step C is performed, until the generated bending information exists but not be repeated, and then the step D is performed.

With the description of the two embodiments in FIG. 16A and FIG. 16B, those skilled in the art can understand clearly how to determine the corresponding customer configuration according to the bending position, and how to determine the corresponding operation mode according to the bending information generated by the bending operation. However, in order that those skilled in the art can understand the invention more clearly, the invention will be described by taking the bending information as an example of the bending manner.

The bending manner refers to folding the flexible display screen as different shapes, gestures or the like according to the positions, types and intersections of all the folding lines.

Figure 17:
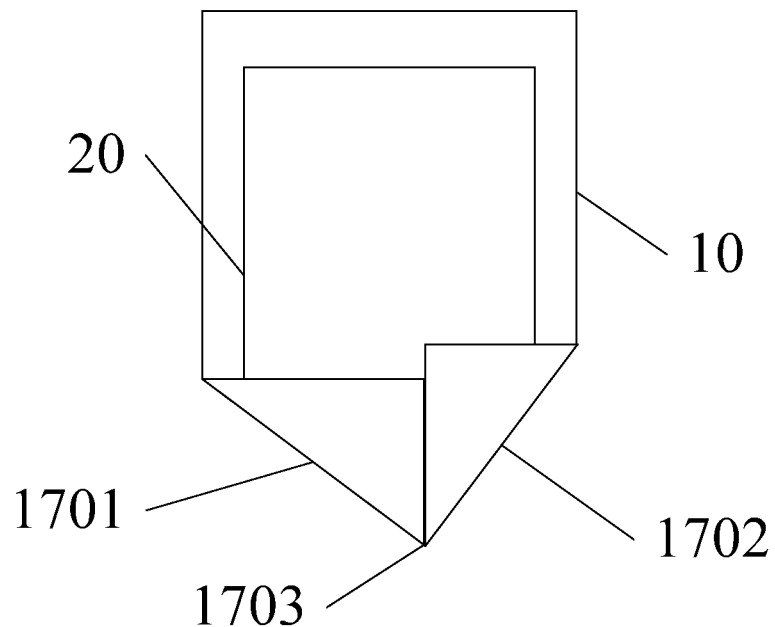
FIG. 17 is a schematic diagram of determining an operation mode according to an embodiment of the invention.

Referring to FIG. 17, when the mobile phone 10 is just powered on and is not bent, the customer bends the mobile phone 10, the mobile phone 10 obtains the bending operation of the customer on the mobile phone 10 by the detection apparatus such as a sensor, and obtains the bending information, such as the positions and types of the folding line 1701 and the folding line 1702 and the intersection 1703 between the folding line 1701 and the folding line 1702, according to the bending operation. By the detection, it is founded that two ends of the folding line 1701 are respectively located at the two third of the bottom side of the mobile phone 10 from the left to the right and the one third of the left side of the mobile phone 10 from the bottom to the top, and the folding line 1701 is a straight line. Two ends of the folding line 1702 are respectively located at the two third of the bottom side of the mobile phone 10 from the left to the right and the two fifth of the right side of the mobile phone 10 from the bottom to the top. The intersection 1703 between the folding line 1701 and the folding line 1702 is located at the two third of the bottom side. In this way, it can be determined that the customer configuration corresponding to the bending information is the customer configuration of the first customer, and the mobile phone 10 is controlled to operate in the customer configuration of the first customer.

In this embodiment, the bending information is different from the above embodiments, and others are similar to those in the above embodiments, which will not be described in detail here.

Further, in another embodiment, the bending information can further include a bending order. For example, the bending information can be the bending position and the bending order, or the bending manner or the bending order. Continue to referring to FIG. 17, the bending information is the bending manner and the bending order. That is to say, not only the positions of the folding line 1701, the folding line 1702 and the intersection 1703, but also the order of the generations of the folding lines 1701 and 1702 needs to be detected. If the folding line 1701 is generated firstly, it indicates that the lower left corner of the mobile phone 10 is folded by the customer firstly and the lower right corner of the mobile phone 10 is then folded. In this case, it is determined that the customer configuration is the customer configuration of the first customer, and the mobile phone 10 is controlled to operate in the customer configuration of the first customer. However, if it is identified that the folding line 1702 is generated firstly, i.e., the lower right corner of the mobile phone 10 is folded by the customer firstly and then the lower left corner of the mobile phone 10 is folded. In this case, it is determined that the customer configuration is the customer configuration of the second customer, and the mobile phone 10 is controlled to operate in the customer configuration of the second customer.

Similarly, no matter what the bending information is, a corresponding relation between the bending information and the operation mode needs to be set in advance. The method for setting the operation mode has been described in the embodiment in which the bending information is the bending position, which will not be described in detail here.

In the above embodiment, the description is given by taking the customer configuration as the operation mode. However, in practice, the operation mode can be for example different operation system. For example, the electronic device has one hardware platform, which is loaded with two different operation systems. The electronic device obtains different bending information by different bending operations, and switches between two different operation systems based on the different bending information. In another embodiment, the operation mode can be different hardware platforms and different operation systems. For example, the electronic device has hardware platforms 1 and 2, the hardware platform 1 corresponds to an operation system 1, and the hardware platform 2 corresponds to an operation system 2. Different bending information is obtained by different bending operations, the electronic device switches between the two different hardware platforms and between the corresponding operation systems based on the different bending information. In another embodiment, the operation mode can be an office mode, a mobile phone mode, and an entertainment mode. The electronic device has only one hardware platform and one operation system. For example, when the customer is working, the electronic device needs to be in the office mode; when the customer is on the way home, the customer can folds the electronic device as a common mobile phone in size for use, so that the electronic device is in the mobile phone mode, for listening to the music, reading an e-book; and when the customer is at home, the electronic can be set in the entertainment mode which is suitable for playing massive network game for example. The methods for obtaining the bending information and determining the operation mode according to the bending information in the paragraph are similar to the various methods described above, which will not be described in detail here. Further, in this paragraph, several different usage scenes are listed for explanation, but not meant to limit the invention.

In another embodiment, in order to ensure the safety and privacy of multiple customers using the same electronic device, when the first operation mode is determined from the multiple operation modes based on the bending information, the customer is further prompted to input a password. The electronic device is controlled to operate in the first operation mode only if the password is correct, so as to avoid the illegal enter of other customers.

As to the password, although the common password setting means, for example, the identity is verified by inputting a serious of preset character strings or by fingerprint identity, can be used, in this embodiment, preferably, the password can be formed by using the foldable feature of the flexible display screen. The flexible display screen can be folded by the customer according to the different bending positions or bending manners, so as to form the password. When it is necessary to verify the password, the flexible display screen is folded according to the bending order and bending position in the setting of the password; if those are identical to the set one, the electronic device is controlled to operate in the corresponding operation mode. Specifically, the method for generating the password is as follow.

Step a: obtaining a second bending operation on the flexible display screen;

Step b: obtaining second bending information generated by the second bending operation; and Step c: processing the second bending information to obtain the password.

In step c, the step of processing the second bending information can include: storing directly the bending position and the bending order, and can also include: converting the bending information into other forms for storing, such as a corresponding character string. Those skilled in the art can also process the bending information to information in other forms, as long as it is unique and can distinguish the customers.

The method for verifying the password is similar to the method for generating the password, except for further including a process of comparing, which will not be described in detail here. In order that those skilled in the art understand the implementation process of taking the bent flexible display screen as the password in this embodiment more clearly, the example shown in FIG. 16A continue to be referred. In the example of FIG. 16A, the mobile phone 10 is bent for one time, and the corresponding customer configuration is determined as the customer configuration of the first customer. However, before the mobile phone 10 is controlled to operate in the customer configuration of the first customer, the customer is prompted to input a password. Because the customer set the password in advance and the password is for example the bending position and bending order as shown in FIG. 17, i.e., the folding line 1701 is generated firstly and then the folding line 1702 is generated, when the customer is prompted to input the password, the customer folds the mobile phone 10 in accordance with the bending position and the bending order as shown in FIG. 17. In the case the password is determined as correct by comparing, the mobile phone 10 is controlled to operate in the customer configuration of the first customer.

Further, if the calling of the customer configuration of the first customer fails, the default customer configuration is called directly.

In another embodiment, the first bending information can also be used as the password. Specifically, the customer bends the mobile phone 10, the mobile phone 10 obtains the bending operation performed by the customer on the mobile phone 10 by the detection apparatus such as a sensor, and obtains the bending information according to the bending operation. The bending information can include the positions of the folding lines 1701 and 1702, the intersection 1703 between the folding line 1701 and the folding line 1702, and the order in which the folding lines 1701 and 1702 are generated. According to the bending information, the operation mode of the electronic device can be determined and the customer password can be obtained. For example, the operation mode of the electronic device can be determined according to the position information of the folding line, and the customer password can be determined according to the intersection of the folding lines and the order in which the folding lines are generated.

The above embodiments can be implemented separately, and can also be implemented dependently, which can be determined by those skilled in the art according to the practical situation.

In the above embodiments, taking the bar mobile phone as an example, the display screen and the main body are both flexible. Thus, the whole electronic device can be bent or folded; and when the electronic device takes flexible variation, the flexible display screen varies as well. Practically, the electronic device can be a device in which the main body and the flexible display screen are separated from each other, i.e., the flexible display screen itself can be bent or folded. It is only necessary to transmit the variation information of the bending or folding to the main body for process, when the flexible display screen is bent or folded.

In the above embodiments, both the display screen and the main body of the electronic device are flexible, and the whole electronic device can be bent or folded. Thus, when the electronic device varies flexibly, the flexible display screen varies as well. Practically, the electronic device can be a device in which the main body and the flexible display screen are separated from each other, i.e., the flexible display screen itself can be bent or folded. It is only necessary to transmit the variation information of the bending or folding to the main body for process, when the flexible display screen is bent or folded. Practically, the above flexible display screen can also be a touch display screen, then in addition to the bending or folding of the display region, the touch region can be further divided. That is to say, there are independent divided touch regions on at least two independent display regions.

The methods in the above embodiments can be implemented separately and can also be implemented dependently, which can be determined by those skilled in the art as required.

Figure 18:
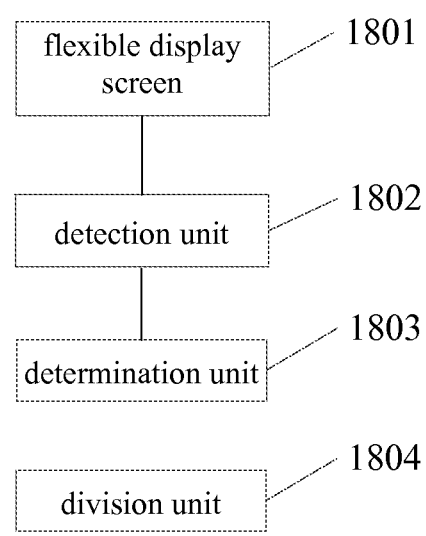
FIG. 18 is a block diagram of an electronic device according to an embodiment of the invention.

Another embodiment of the invention further provides an electronic device, for implementing the method for controlling the electronic device described in the above embodiments. Reference is made to FIG. 18, which is a structural diagram of the electronic device according to this embodiment.

As shown in FIG. 18, the electronic device includes: a flexible display screen 1801 with a first display region; a detection unit 1802 adapted to detect whether the flexible display screen 1801 has been bent to generate detection information; and a division unit 1804 adapted to divide the first display region into a first display sub-region and a second display sub-region in the case that the detection information indicates that the flexible display screen has been bent, where the first display sub-region is independent of the second display sub-region.

The detection unit 1802 may be for example a weight sensor, a spatial sensor or an angle sensor.

The division unit 1804 is adapted to determine a cutting line in the first display region; and then divide the first display region into the first display sub-region and the second display sub-region based on the cutting line.

Further, the flexible display screen 1801 can be bent for N times, in which N is an integer greater than 1. In the case that the flexible display screen 1801 is bent for the N+1th time, the division unit 1804 is adapted to detect respectively whether a new cutting line is generated in each display sub-region after the N times of bending; divide the display sub-region including the new cutting line into two sub-regions according to the new cutting line if the new cutting line is generated.

In an embodiment, the electronic device further includes a determination unit 1803 adapted to determine whether the bending angle of the flexible display screen meets the predetermined condition in the case that the detection information indicates that the flexible display screen is bent. The predetermined condition is a bending angle of the flexible display screen when a first part of the flexible display screen is sheltered by a second part of the flexible display screen.

Further, a display object is displayed in the first display region, and the electronic device further includes a display unit adapted to display the display object in the first display sub-region in the size suitable for the first display sub-region, when the first display region is divided into the first display sub-region and the second display sub-region.

In another embodiment, at least two display objects are displayed in the first display region, and the electronic device further includes a display unit adapted to display in the first display sub-region one of the at least two display objects, the size of which is suitable for the first display sub-region, in the case that the first display region is divided into the first display sub-region and the second display sub-region.

In another embodiment, at least one display object is displayed in the first display region, and the electronic device further includes a display unit adapted to display any one or all of the at least one display objects in the first display sub-region and the second display sub-region, in the case that the first display region is divided into the first display sub-region and the second display sub-region.

In a further embodiment, the first display sub-region and the second display sub-region can be operated independently, i.e., the display object in the first display sub-region is operated, and an operation result is displayed in the first display sub-region but not in the second display sub-region.

Figure 19:
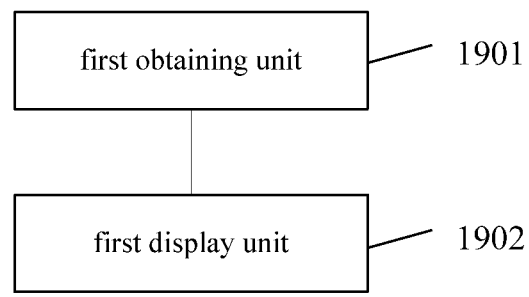
FIG. 19 is a block diagram of an electronic device according to an embodiment of the invention.

In this embodiment, as shown in FIG. 19, the electronic device further includes a first obtaining unit 1901 adapted to obtain a first input operation in a first sub-region of the first display sub-region, in which the first input operation corresponds to a first display object; and a first display unit 1902 adapted to display the first display object in a second sub-region of the second display sub-region.

Figure 20:
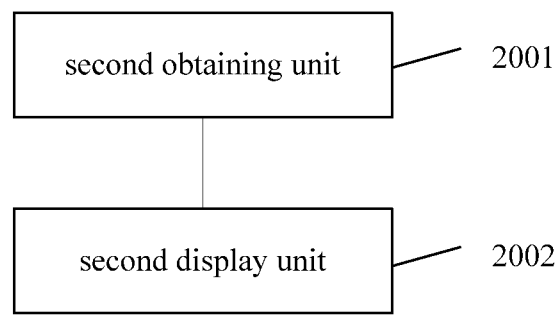
FIG. 20 is a block diagram of an electronic device according to an embodiment of the invention.

Further, as shown in FIG. 20, the electronic device further includes a second obtaining unit 2001 adapted to obtain a second input operation in a third sub-region of the second display sub-region, in which the second input operation corresponds to a second display object; and a second display unit 2002 adapted to display the second display object in a fourth sub-region of the first display sub-region.

Figure 21:
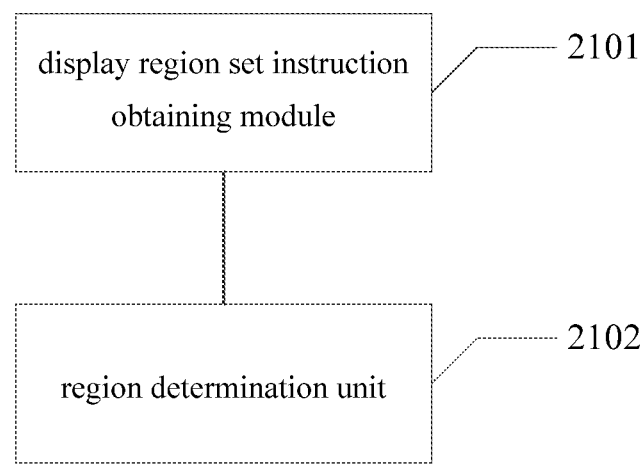
FIG. 21 is a block diagram of an electronic device according to an embodiment of the invention.

As shown in FIG. 21, the electronic device further includes the follows.

A display region setting instruction obtaining module 2101 is adapted to obtain a display region setting instruction, and generate a first sub-region in the first display sub-region in which the display object is synchronously displayed in the first display sub-region and the second display sub-region according to the region setting instruction.

A region determination unit 2102 is adapted to determine a first sub-region in the first display sub-region and determine a second sub-region in the second display sub-region according to the display region setting instruction.

Figure 22:
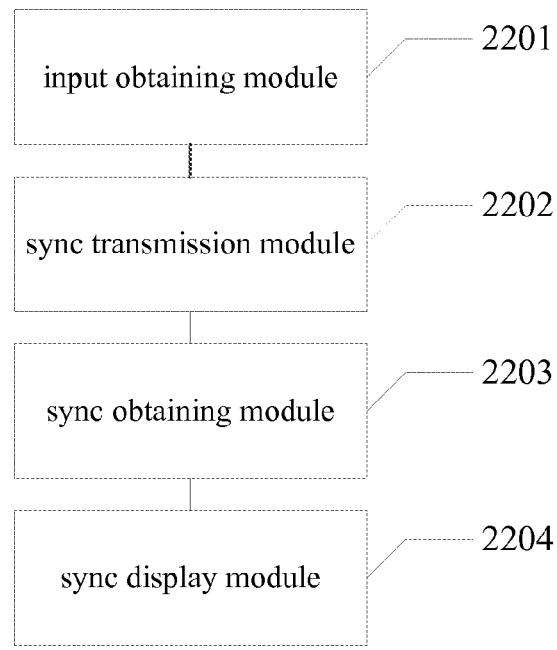
FIG. 22 is a block diagram of an electronic device according to an embodiment of the invention.

FIG. 22 shows another structure of the first display unit according to the application. The first display unit 1902 includes the follows.

An input obtaining module 2201 is adapted to obtain a second display content that is input into the second sub-region.

A sync transmission module 2202 is adapted to transmit the second display content to the second sub-region in real time.

A sync obtaining module 2203 is adapted to obtain the display content transmitted from the second sub-region.

A sync display module 2204 is adapted to display the second display content in the second sub-region.

The input obtaining module 2201 will obtain the second display content that is input by the customer into the second sub-region, and transmit the second display content to the sync transmission module 2201. The transmitted second display content is the content that is input by the customer. That is to say, every time the customer inputs a completed character, the sync transmission module 2202 will transmit the character to the sync obtaining module 2203 of the electronic device. The sync obtaining module 2203 transmits the second display content to the sync display module 2204 after receiving the second display content; and finally the sync display module 2204 displays the obtained second display content in the second sub-region synchronously.

For example, when the customer inputs "study well and make progress every day" into the first sub-region, the customer inputs "study" into the first sub-region, the "study" input by the customer will be displayed synchronously in the second sub-region. Thus, when the customer inputs one word into the first display sub-region, the word will be displayed in the second sub-region; and when the display contents are all input into the first sub-region, the displaying of the input content in the second sub-region is finished.

Figure 23:
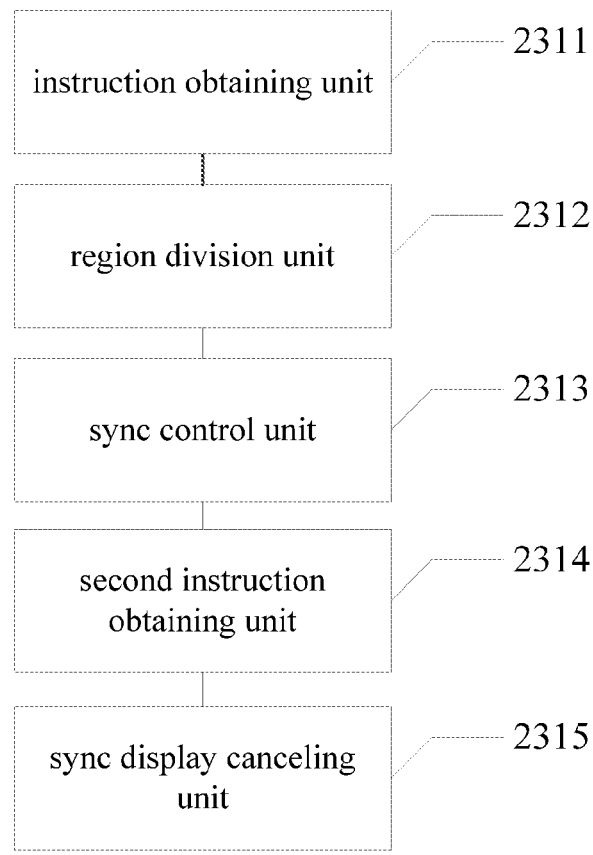
FIG. 23 is a block diagram of an electronic device according to an embodiment of the invention.

FIG. 23 is a structural diagram of an electronic device according to the application, and the electronic device includes the follows.

An instruction obtaining unit 2311 is adapted to obtain from the customer a first instruction for dividing the display screen.

A region dividing unit 2312 is adapted to divide the display screen into at least M display regions according to the first instruction, where M is an integer greater than 2.

A sync control unit 2313 is adapted to obtain a first display object on a first display region of the M display regions, and display the first display object in M−1 display regions synchronously.

A second instruction obtaining unit 2314 is adapted to obtain a second instruction for canceling the sync display that is input by the customer.

A sync display canceling unit 2315 is adapted to cancel the sync display of the display object that is input into the first display region after the second instruction, according to the second instruction.

Figure 24:
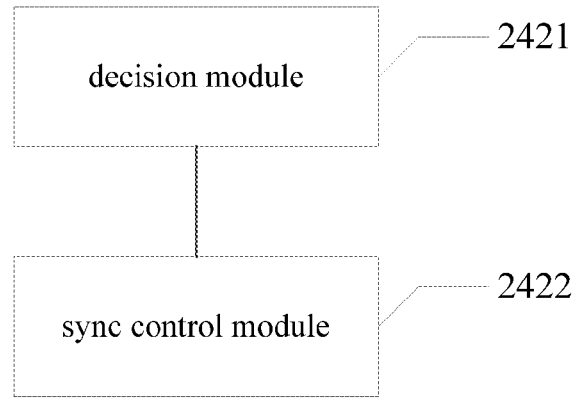
FIG. 24 is a block diagram of an electronic device according to an embodiment of the invention.

FIG. 24 is a structural diagram of a sync control unit according to the application, and the sync control unit 2313 includes the follows.

A decision module 2421 is adapted to decide whether the first display object is a display object in the first display region.

A sync control module 2422 is adapted to display the first display object in M−1 display regions synchronously if the first display object is the display object in the first display region.

In another embodiment, the electronic device further includes a first adjustment unit and a second adjustment unit. The first adjustment unit is adapted to adjust the display direction of the display object in the first display sub-region, and the second adjustment unit is adapted to adjust the display direction of the display object in the second display sub-region.

Figure 25:
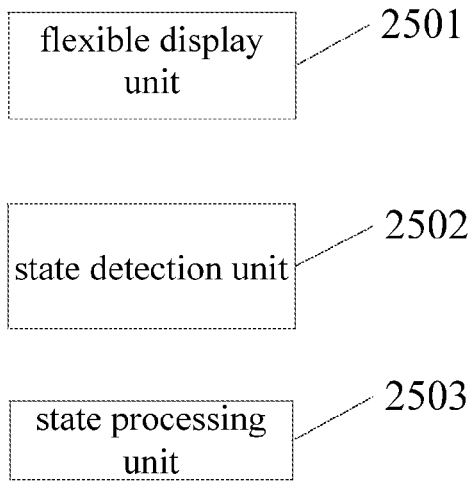
FIG. 25 is a block diagram of an electronic device according to an embodiment of the invention.

Specifically, as shown in FIG. 25, the electronic device further includes: a state detection unit 2501 adapted to detect a state of the first display sub-region when the detection information indicates that the flexible display screen is bent; and a state processing unit 2502 adapted to determine a display direction of the display object in the first display sub-region according to the state of the first display sub-region.

Further, the electronic device includes: a flexible display screen 2501, a state detection unit 2502 and a state processing unit 2503. The flexible display screen 2501 has an unfolded state and a folded state. In the case of the unfolded state, the flexible display screen 2501 has a first display region (such as the first display region 202 in FIG. 2A). In the case of the folded state, the first display region forms at least a first display sub-region (such as 206 in FIG. 2C) and a second display sub-region (such as 207 in FIG. 2B) according to a folding line. The state detection unit 2502 is adapted to detect the state of the first display sub-region when the flexible display screen 2501 is in the folded state. The state processing unit 2503 is adapted to determine the display direction of the display object in the first display sub-region according to the state of the first display sub-region.

The state detection unit 2502 is further adapted to detect a state of the second display sub-region when the flexible display screen 2501 is in the folded state, and determine a display direction of the display object in the second display sub-region according to the state of the second display sub-region.

Further, the state detection unit 2502 is specifically adapted to detect position information of the customer with respect to the first display sub-region. Further, the state processing unit 2503 is specifically adapted to determine the display direction of the display object in the first display sub-region according to the position information.

In another embodiment, the electronic device further includes multiple sensors provided on the flexible display screen 2501 and adapted to detect a state of the flexible display screen 2501. The state detection unit 2502 is specifically adapted to receive the data that is transmitted by a sensor located in the first display sub-region, and determine a weight direction of the first display sub-region according to the data transmitted by the sensor. Further, the state processing unit 2503 is specifically adapted to determine whether the display direction of the display object in the first display sub-region is identical to the weight direction thereof.

In another embodiment, the electronic device further includes a second state detection unit adapted to detect whether a new display sub-region is generated in the first display region, in which the new display sub-region is different from the first display sub-region and the second display sub-region. If a new display sub-region is generated, the state processing unit 2503 determines a display direction of a display object in the new display sub-region.

Figure 26:
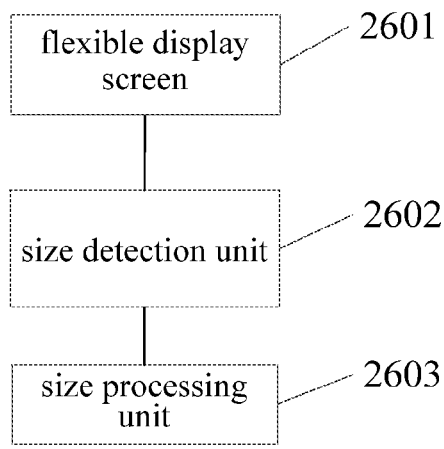
FIG. 26 is a block diagram of an electronic device according to an embodiment of the invention.

According to another embodiment of the invention, as shown in FIG. 26, the electronic device further includes: a size detection unit 2602 adapted to detect a size of the first display sub-region when the detection information indicates that the flexible display screen is bent; and a size processing unit 2603 adapted to set a screen resolution of the first display sub-region according to the size of the first display sub-region.

Further, the size detection unit 2602 is further adapted to detect a size of the second display sub-region when the detection information indicates that the flexible display screen is bent; and a size processing unit 2603 further adapted to set a screen resolution of the second display sub-region according to the size of the second display sub-region.

The electronic device includes a flexible display screen 2601, a size detection unit 2602 and a size processing unit 2603. The flexible display screen 2601 has an unfolded state and a folded state. In the case of the unfolded state, the flexible display screen 2501 has a first display region (such as the first display region 202 in FIG. 2A). In the case of the folded state, the first display region forms at least a first display sub-region (such as 206 in FIG. 2C) and a second display sub-region (such as 207 in FIG. 2B) according to a folding line. The size detection unit 2602 is adapted to detect a size of the first display sub-region when the flexible display screen 2601 is in the folded state. The size processing unit 2603 is adapted to set a screen resolution for the first display sub-region according to the size of the first display sub-region.

The methods in the above embodiments can be implemented separately and can also be implemented dependently, which can be determined by those skilled in the art as required.

The size detection unit 2602 is further adapted to detect a size of the second display sub-region when the flexible display screen 2601 is in the folded state, and set a screen resolution for the second display sub-region according to the size of the second display sub-region.

Further, the electronic device further includes a second size detection unit adapted to one of the at least one folding lines that is located in the first display sub-region; and the first detection unit detects the size of the first display sub-region based on the folding line located in the first display sub-region.

The size processing unit 2603 is specifically adapted to set the screen resolution for the first display sub-region according to the size of the first display sub-region, based on a corresponding relation table between the screen size and the screen resolution. In another embodiment, the size processing unit 2603 is specifically adapted to set a customer-defined screen resolution for the first display sub-region according to the size of the first display sub-region. As to the specific implementation processes, reference can be made to the embodiment of the method for adjusting the resolution described above, which will not be described in detail here. Practically, other strategy for adjusting the resolution can be adopted, as long as the corresponding screen resolution can be adjusted according to the size of the display sub-region after the folding.

In another embodiment, the electronic device further includes a third size detection unit adapted to detect whether a new display sub-region is generated in the first display region, in which the new display sub-region is different from the first display sub-region and the second display sub-region. If a new display sub-region is generated, the size processing unit 2603 set a screen resolution for the new display sub-region. In this embodiment, once the generation of the new display sub-region is detected, a proper screen resolution is set for the new display sub-region at once. In other embodiment, the adjustment of the screen resolution can be started after the function of adjusting the screen resolution is enabled by the customer.

Figure 27:
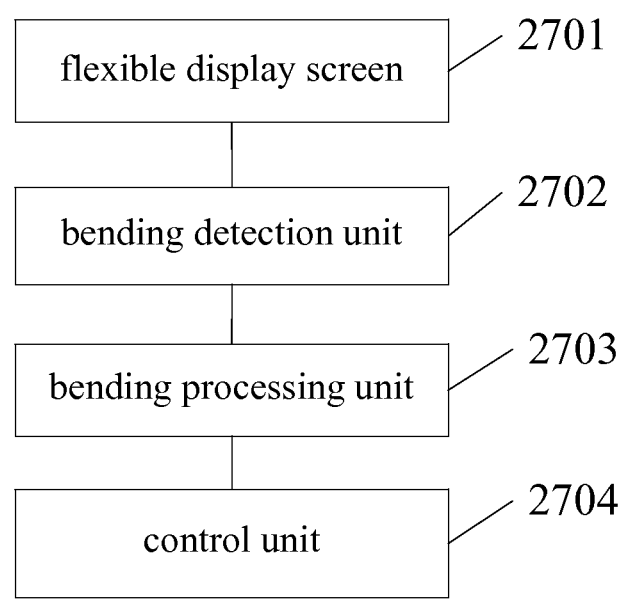
FIG. 27 is a block diagram of an electronic device according to an embodiment of the invention.

In another embodiment of the invention, the electronic device has multiple operation modes which are different from each other. Reference is made to FIG. 27, which is a functional block diagram of the electronic device in this embodiment.

As shown in FIG. 27, the electronic device includes: a flexible display screen 2701 which is bendable; a bending detection unit 2702 adapted to obtain a first bending operation on the flexible display screen 2701; a bending processing unit 2703 adapted to obtain first bending information generated by the first bending operation, and determine a first operation mode from the multiple operation modes according to the first bending information; and a control unit 2704 adapted to control the electronic device to operate in the first operation mode. Different bending operations correspond to different bending information, and different bending information corresponds to different operation modes.

The bending detection unit 2702 may be for example a weight sensor or a spatial sensor located the top and bottom sides of the flexible display screen 2701. The bending detection unit 2702 can also be an angle sensor provided on the left and right sides of the flexible display screen 2701. In other embodiments, other detection apparatus can also be applied; and according to the practical requirements, the bending detection unit 2702 can be provided at any position of the flexible display screen 2701.

Further, the bending processing unit 2703 is specifically adapted to determine whether new bending information is generated by the first bending operation during a predetermined time, before determining the first operation mode from the multiple operation modes according to the first bending information. If the new bending information is generated, a second operation mode is determined from the multiple operation modes according to the new bending information, where the second operation mode is different from the first operation mode, referring to the description of the embodiment of the method for controlling the electronic device, which will not be described in detail here.

In another embodiment, the bending processing unit 2703 is specifically further adapted to detect whether new bending information is generated when the electronic device operates in the first operation mode. If the new bending information is generated, a second operation mode is determined from the multiple operation modes according to the new bending information, and the electronic device is switched from the first operation mode to the second operation mode, where the second operation mode is different form the first operation mode.

In another embodiment, the bending detection unit 2702 is specifically further adapted to obtain a second bending operation on the flexible display screen 2701. The bending processing unit 2703 is specifically further adapted to obtain second bending information generated by the second bending operation, and process the second bending information to obtain a password, where the password is used to verify the identity of the customer when the control unit 2704 controls the electronic device to operation in the first operation mode.

Further, in the first operation mode, the display region of the flexible display screen is the region that is determined after the bending. In another embodiment, in the first operation mode, the display region of the flexible display screen 2701 is the whole screen.

In the above embodiments, the flexible display screen and the main body of the electronic device are both flexible, and the whole electronic device can be bent or folded. Thus, when the electronic device takes flexible variation, the flexible display screen varies as well. Practically, the electronic device can be a device in which the main body and the flexible display screen are separated from each other, i.e., the flexible display screen itself can be bent or folded. It is only necessary to transmit the variation information of the bending or folding to the main body for process, when the flexible display screen is bent or folded.

The above embodiments can be implemented separately, and can also be implemented dependently, which can be determined by those skilled in the art according to the practical situation.

Various variations and embodiments of the method for controlling the electronic device in the above embodiments can be applied to the electronic device of this embodiment; with the detail description of the method for controlling the electronic device described above, those skilled in the art can know clearly the implementation method of the electronic device in this embodiment, which will not be described for brevity of the description.

It is to be understood by those skilled in the art that the embodiment of the invention can be provided as a method, a system or a computer program product. Thus, the invention can be implemented in the form of complete hardware, complete software or combination of hardware and software. Moreover, the invention can adopt the form of a computer program product implemented on one or more computer readable storage medium (including but not limited to the magnetic storage, optical storage or the like) including the computer readable program code.

The invention is described referring to the flowchart and/or block diagram of the method, device (system) and computer program product. It is to be understood that each one or combination of the flowcharts and/or block diagrams can be implemented by the computer program instructions. These computer program instructions can be supplied to a general-purpose computer, a dedicated computer, an embedded processor or a processor of other programmable data processing device, so as to generate a machine, so that the apparatus for implementing the function specified in the one or more flowcharts and/or one or more block diagrams can be generated by the instruction executed by the processor of the computer or other programmable data process device.

These computer program instruction can also be stored in the computer readable storage that is able to instruct the computer or other programmable data processor, so that the instructions stored in the computer readable storage can generate a product including the instruction apparatus which can implement the function specified in one or more flowcharts and/or one or more block diagrams.

These computer program instructions can be loaded into the computer or other programmable data processor, so that a series of operation steps can be performed on the computer or other programmable apparatus so as to generate the computer-implemented process, thus the instruction executed on the computer or other programmable apparatus can provide the functional step specified in one or more flowcharts and/or one or more block diagrams.

In an embodiment of the invention, it is detected whether the flexible display screen is bent. When the flexible display screen is bent to a certain extent, the flexible display screen is divided into two display sub-regions, and the two display sub-regions are independent of each other, so that the display object is displayed in the display sub-region, and the display object will not be bent due to the bending of the display screen. Thus, it is convenient for the customer to use and the customer experience is good.

Further, in an embodiment of the invention, the display object with the size suitable for the display sub-region is selected to be displayed in this display region, so that each of the display sub-regions is used effectively, and the display object is displayed better without zooming out the display object.

Further, in an embodiment of the invention, after the display screen is folded and divided into multiple display sub-regions, each display sub-region can display a content, so that it is suitable for be watched by multiple persons simultaneously.

Further, in an embodiment of the invention, a display direction of a display object in each display sub-region is further adjusted, so that it is convenient for the customer to use the electronic device.

Further, in an embodiment of the invention, after the display is folded and divided into multiple display sub-regions, each display sub-region can be operated separately, so that multiple persons can operate the electronic device simultaneously, and one electronic device can achieve the functions of multiple electronic devices.

Apparently, various modifications and variations can be made by those skilled in the art without deviating from the spirit and scope of the invention. Thus, if these modifications and variations belong to the scope of the claim and the equivalent technique of the invention, the invention is intended to contain these modifications and variations.

The invention claimed is:

1. A method for controlling an electronic device, the electronic device having a flexible display screen with a first display region, and the method comprising:
   obtaining a second bending operation on the flexible display screen; obtaining second bending information generated by the second bending operation, wherein the second bending information comprises bending positions of the flexible display screen and an order of generating the bending positions; and processing the second bending information to obtain a password,
   wherein the flexible display screen has an unfolded state and a folded state; in the case of the unfolded state, the flexible display screen has the first display region; in the case of the folded state, the first display region is divided into a first display sub-region and a second display sub-region based on at least one folding line; and the method further comprises:

detecting whether the flexible display screen is bent to generate detection information; and dividing the first display region into a first display sub-region and a second display sub-region, in the case that the detection information indicates that the flexible display screen is bent, wherein the first display sub-region is independent of the second display sub-region, detecting a first special character input into the first display sub-region; and configuring the electronic device to synchronously display a first display content in the second display sub-region and in the first display sub-region, in response to detecting the first specific character, wherein the first display content is input into the first display sub-region after the first special character is detected;

synchronously displaying the first display content in the second display sub-region and in the first display sub-region.

2. The method according to claim 1, wherein before the dividing the first display region into a first display sub-region and a second display sub-region, the method further comprises: determining whether a bending angle of the flexible display screen meets a predetermined condition, wherein the predetermined condition is a bending angle of the flexible display screen in the case that a first part of the flexible display screen is sheltered by a second part of the flexible display screen.

3. The method according to claim 2, wherein the dividing the first display region into a first display sub-region and a second display sub-region comprises:

determining a position of the bending in the first display region, and using the position of the bending as a folding line; and dividing the first display region into a first display sub-region and a second display sub-region based on the folding line.

4. The method according to claim 3, wherein one display object is displayed in the first display region; and in the case that the first display region is divided into a first display sub-region and a second display sub-region, the display object is displayed in the first display sub-region in a size that is suitable for the first display sub-region.

5. The method according to claim 3, wherein at least two display objects are displayed in the first display region; and in the case that the first display region is divided into a first display sub-region and a second display sub-region, the display object of the at least two display objects which has a size matching with the size of the first display sub-region is displayed in the first display sub-region.

6. The method according to claim 3, further comprising, in the case that the first display region is divided into a first display sub-region and a second display sub-region based on the folding line:

detecting a size of the first display sub-region, in the case that the detection information indicates that the flexible display screen is bent; and setting a screen resolution of the first display sub-region according to the size of the first display sub-region.

7. The method according to claim 6, wherein the detecting the size of the first display sub-region comprises:

detecting a folding line of the at least one folding lines that is located in the first display sub-region; and detecting the size of the first display sub-region based on the folding line in the first display sub-region.

8. The method according to claim 1, wherein the flexible display screen is bent for N times, wherein N is an integer equal to or greater than 1; in the case that the flexible display screen is bent for the N+1 th time, it is detected whether a new folding line is generated in each of the display sub-regions formed after N times of bending; if a new folding line is generated, the display sub-region containing the new folding line is divided according to the new folding line.

9. The method according to claim 1, wherein the flexible display screen varies with variation in the flexibility of the electronic device.

10. The method according to claim 1, further comprising:

detecting a second special character input into the first display sub-region; and configuring the electronic device to not synchronously display a second display content in the second display sub-region and in the first display sub-region, in response to detecting the second specific character, wherein the second display content is input into the first display sub-region after the second special character is detected.

11. The method according to claim 1, wherein the electronic device has a plurality of operation modes, and the method further comprises: obtaining first bending information generated by a bending operation in the case that the detection information indicates that the flexible display screen is bent; determining a first operation mode from a plurality of operation modes according to the first bending information; and controlling the electronic device to operate in the first operation mode, different bending operations corresponding to different bending information, and different bending information corresponding to different operation modes.

12. The method according to claim 11, wherein the first bending information comprises a bending position, a bending manner or a bending order of the flexible display screen.

13. The method according to claim 11, wherein before the determining a first operation mode from a plurality of operation modes according to the first bending information, the method further comprises:

detecting new bending information generated by the first bending operation during a predetermined time; and determining a second operation mode from the plurality of operation modes according to the new bending information, wherein the second operation mode is different from the first operation mode.

14. An electronic device, comprising:

a flexible display screen with a first display region;

a processor, and a memory having processor-executable instructions stored therein, and the instructions when executed by the processor configure the electronic device to;

obtain a second bending operation on the flexible display screen;

obtain second bending information generated by the second bending operation, wherein the second bending information comprises bending positions of the flexible display screen and an order of generating the bending positions; and process the second bending information to obtain a password;

wherein the electronic device is further configured to:

detect whether the flexible display screen is bent to generate detection information; and divide the first display region into a first display sub-region and a second display sub-region in the case that the detection information indicates that the flexible display screen is bent, wherein the first display sub-region is independent of the second display sub-region;
wherein the electronic device is further configured to detect a first special character input into the first display sub-region;
wherein in response to detecting the first specific character, the electronic device is further configured to:
synchronously display a first display content in the second display sub-region and in the first display sub-region, wherein the first display content is input into the first display sub-region after the first special character is detected.

15. The electronic device according to claim 14, wherein the electronic device is further configured to:
determine whether a bending angle of the flexible display screen meets a predetermined condition in the case that the detection information indicates that the flexible display screen is bent, wherein the predetermined condition is a bending angle of the flexible display screen in the case that a first part of the flexible display screen is sheltered by a second part of the flexible display screen.

16. The electronic device according to claim 15, wherein the electronic device is further configured to:
determine a position of the bending in the first display region, and use the position of the bending as a folding line; and
divide the first display region into a first display sub-region and a second display sub-region based on the folding line.

17. The electronic device according to claim 16, wherein one display object is displayed in the first display region; and in the case that the first display region is divided into a first display sub-region and a second display sub-region, the display object is displayed in the first display sub-region in a size that is suitable for the first display sub-region.

18. The electronic device according to claim 16, wherein at least two display objects are displayed in the first display region; and in the case that the first display region is divided into a first display sub-region and a second display sub-region, the display object of the at least two display objects which has a size matching with the size of the first display sub-region is displayed in the first display sub-region.

19. The electronic device according to claim 15, the electronic device is further configured to:
detect a size of the first display sub-region, in the case that the detection information indicates that the flexible display screen is bent; and
set a screen resolution of the first display sub-region according to the size of the first display sub-region.

20. The electronic device according to claim 19, wherein the electronic device is further configured to:

detect a size of the second display sub-region, in the case that the detection information indicates that the flexible display screen is bent; and
set a screen resolution of the second display sub-region according to the size of the second display sub-region.

21. The electronic device according to claim 19, wherein the electronic device is further configured to store previously a corresponding relation table between a screen size and the screen resolution; and set a screen resolution of the first display sub-region according to a size of the first display sub-region based on the corresponding relation table between the screen size and the screen resolution.

22. The electronic device according to claim 19, wherein the electronic device is further configured to set a customer-defined screen resolution for the first display sub-region according to the size of the first display sub-region.

23. The electronic device according to claim 14,
wherein in response to detecting a second special character input into the first display sub-region, the electronic device is further configured to:
not synchronously display a second display content in the second display sub-region and in the first display sub-region, wherein the second display content is input into the first display sub-region after the second special character is detected.

24. The electronic device according to claim 14, wherein the electronic device is further configured to
obtain first bending information generated by a first bending operation, in the case that the detection information indicates that the flexible display screen is bent and determine a first operation mode from a plurality of operation modes according to the first bending information; and
to control the electronic device to operation in the first operation mode.

25. The electronic device according to claim 24, wherein the electronic device is further configured to, before the determining a first operation mode from a plurality of operation modes according to the first bending information, detect new bending information generated by the first bending operation during a predetermined time and determine a second operation mode from the plurality of operation modes according to the new bending information, wherein the second operation mode is different from the first operation mode.

26. The electronic device according to claim 24, wherein different operation modes correspond to different configurations of the electronic device, and are associated with different user accounts of the electronic device.

* * * * *